United States Patent [19]

Mukherjee et al.

(10) Patent No.: US 10,970,449 B2
(45) Date of Patent: Apr. 6, 2021

(54) LEARNING FRAMEWORK FOR SOFTWARE-HARDWARE MODEL GENERATION AND VERIFICATION

(71) Applicant: International Business Machines Corporation, Armonk, NY (US)

(72) Inventors: Rajdeep Mukherjee, Kolkata (IN); Raphael Polig, Langnau am Albis (CH); Mitra Purandare, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 15/709,850

(22) Filed: Sep. 20, 2017

(65) Prior Publication Data

US 2019/0087513 A1    Mar. 21, 2019

(51) Int. Cl.
*G06F 30/3323* (2020.01)
*G06F 9/00* (2006.01)
*G06F 30/20* (2020.01)
*G06F 117/08* (2020.01)

(52) U.S. Cl.
CPC .......... *G06F 30/3323* (2020.01); *G06F 9/00* (2013.01); *G06F 30/20* (2020.01); *G06F 2117/08* (2020.01)

(58) Field of Classification Search
CPC ...... G06F 17/504; G06F 9/00; G06F 17/5009; G06F 2217/86
See application file for complete search history.

(56) References Cited

U.S. PATENT DOCUMENTS

| 7,290,230 | B2 | 10/2007 | Prasad |
| 7,685,547 | B1 * | 3/2010 | Gupta ............... G06F 17/504 716/106 |
| 8,205,175 | B2 | 6/2012 | Waters et al. |

(Continued)

FOREIGN PATENT DOCUMENTS

EP    2012245 A1 *   1/2009   ......... G06F 30/3323

OTHER PUBLICATIONS

Abdel-Hamid, Amr & Zaki, Mohamed & Tahar, S.. (2004). A tool converting finite state machine to VHDL. Canadian Conference on Electrical and Computer Engineering. 4. 1907-1910 vol. 4. 10.1109/CCECE.2004.1347584.*

Rajdeep Mukherjee, Michael Tautschnig, and Daniel Kroening. 2016. v2c—A Verilog to C Translator. In Proceedings of the 22nd International Conference on Tools and Algorithms for the Construction and Analysis of Systems—vol. 9636, Marsha Chechik and Jean-François Raskin (Eds.), vol. 9636. Springer-Verlag New.*

(Continued)

*Primary Examiner* — Saif A Alhija
*Assistant Examiner* — Peter Pham
(74) *Attorney, Agent, or Firm* — Donald G. Weiss

(57) ABSTRACT

Generating an abstract model of the behavior of a hardware and/or software design. A learning framework learns an unknown regular language that represents the behaviors of the hardware and/or software logic which do not violate a specified property that the abstract model is required to satisfy. The framework receives input data including the specified property, concrete models of the behavior of the hardware and/or software; and an alphabet of all symbols that are allowed to occur in any string that can be defined in the unknown regular language, each symbol representing an event in the hardware and/or software. The framework generates an abstract model of the behavior of the hardware or software design by checking whether a sequence of events in a concrete model satisfies the specified property and outputs the generated abstract model.

18 Claims, 6 Drawing Sheets

(56) References Cited

U.S. PATENT DOCUMENTS

| | | | |
|---|---|---|---|
| 8,539,405 B2 | 9/2013 | Kurshan et al. | |
| 8,719,747 B2 | 5/2014 | Platzker et al. | |
| 9,047,427 B1 | 6/2015 | Doucet et al. | |
| 2005/0166167 A1* | 7/2005 | Ivancic | G06F 30/3323 703/22 |
| 2005/0235257 A1* | 10/2005 | Ball | G06F 11/3608 717/108 |
| 2007/0168988 A1* | 7/2007 | Eisner | G06F 9/44589 717/126 |
| 2008/0082968 A1* | 4/2008 | Chang | G06F 11/3688 717/128 |
| 2017/0031806 A1* | 2/2017 | Purandare | G06F 11/3608 |

OTHER PUBLICATIONS

Angluin, D.: "Learning regular sets from queries and counterexamples" Inf. Comput. 75(2). pp. 87-106 (1987).
"I/O Pin Muxing—Flex Logix FPGA Cores" WayBack Machine. Sep. 28, 2016. <http://www.flex-logix.com/pin-muxing>. Three pages.
Nikhil "Abstraction in Hardware System Design" acmqueue. System Evolution Aug. 18, 2011. vol. 9, Issue 8. Sixteen pages.
Sanguinetti "Abstraction Levels and Hardware Design" Jul. 17, 2017. EETimes Connecting the Global Electronics Community. Seven pages.

\* cited by examiner

| HW Model (in Verilog) | Property (φ) |
|---|---|
| ```verilog
module controller(clk, rst,
        valid, ack) begin
  input clk, rst, valid;
  output ack;
  always @(posedge clk)
  begin
    if(rst) begin
     ack = 0;
    end
    else begin
     if(valid) begin
      ack = 1;
     end
    end
  end
end
``` | $\varphi : (!(submit) \| (controller.ack))$ |

Fig. 5

| SW Model (in C) | HW Model (in Verilog) | Property (φ) |
|---|---|---|
| ```
_Bool job_submit(unsigned jobID) {
  if(jobID > 0x1f) {
    // access to HW signal
    controller.valid = 1;
    return true;
  }
  else
    return false;
} int main() {
  _Bool submit = false;
  submit = job_submit(jobID);
}
``` | ```
module controller(clk, rst,
        valid, ack) begin
input clk, rst, valid;
output ack;
always @(posedge clk)
begin
  if(rst) begin
    ack = 0;
  end
  else begin
    if(valid) begin
      ack = 1;
    end
  end
end
end
``` | φ : (!(submit)\|\|(controller.ack)) |

Fig. 7

LEARNING FRAMEWORK FOR SOFTWARE-HARDWARE MODEL GENERATION AND VERIFICATION

BACKGROUND

The present invention relates to generation and verification of abstract models, and in particular to the generation of abstract hardware models and abstract software models and the verification of hardware-software co-designs.

In software engineering and computer science, abstraction is a technique for arranging and reducing complexity of systems, in particular computer systems and its software and/or hardware components. It works by establishing a level of complexity on which a person interacts with the system, suppressing the more complex details below the current level. The programmer works with an idealized interface (usually well defined) and can add additional levels of functionality that would otherwise be too complex to handle. For example, a programmer writing code that involves numerical operations to be performed by a particular hardware module may not be interested in the concrete model by which numbers are represented in this hardware module (e.g., whether they're 16 bit or 32 bit integers). By suppressing (abstracting away) those details of the concrete model, a simplified or abstract model of the hardware module is provided which simply receives and returns some numbers via a defined, simple interface with which the programmer and other system components can work and interact easily. To give a further example, the task of sending an email message across continents would be extremely complex if the programmer had to start with a piece of fiber optic cable and basic hardware components (the concrete model). By using abstracted models of hardware and/or software systems, modules, physical cables, and network layout, the programmer or other system components are presented with a virtual data channel, this extremely complex task is made manageable. According to a still further example, the notion of an object in object-oriented programming can be viewed as a way to combine abstractions of concrete data and code.

SUMMARY

In one aspect, the invention relates to a computer-implemented method for generating an abstract model of the behavior of a hardware or software logic. The method comprises providing a model generation framework. The model generation framework is configured for learning an unknown regular language representing the behavior of the hardware or software logic which do not violate a property $\varphi$ that the abstract model is required to satisfy. The language is represented by strings. The model generation framework receives input data. The input data comprises: (i) the property $\varphi$ that the abstract model is required to satisfy; (ii) a concrete model of the behavior of the hardware or software logic; and (iii) an alphabet $\Sigma$, the alphabet being the set of all symbols that are allowed to occur in any string that can be defined in the unknown regular language, each symbol representing an event occurring in the hardware or software logic, each string describing a sequence of events representing a behavior of the hardware or software logic.

The model generation framework generates an abstract model of the behavior of the hardware or software. Each generated abstract model satisfies the property $\varphi$. The generation comprises checking whether a sequence of events in the concrete model M satisfies the property $\varphi$. Then, the model generation framework outputs the generated abstract model.

In a further aspect, the invention relates to a computer program product comprising computer-readable instructions which, when executed by a processor, cause the processor to perform the above specified method for generating the abstract model of the behavior of a hardware or software logic.

In a further aspect, the invention relates to a computer system configured for generating an abstract model of the behavior of a hardware or software logic. The computer system comprises a model generation framework which is configured for learning an unknown regular language representing the behavior of the hardware or software logic which do not violate a property $\varphi$ that the abstract model is required to satisfy. The language is represented by strings. The model generation framework is configured to receive input data. The input data comprises: (i) the property $\varphi$ that the abstract model is required to satisfy; (ii) a concrete model of the behavior of the hardware or software logic; and (iii) an alphabet $\Sigma$, the alphabet being the set of all symbols that are allowed to occur in any string that can be defined in the unknown regular language, each symbol representing an event occurring in the hardware or software logic, each string describing a sequence of events representing a behavior of the hardware or software logic.

The model generation framework is configured to generate an abstract model of the behavior of the hardware or software. The generated abstract model satisfies the property $\varphi$. The generation comprises checking whether a sequence of events in the concrete model M satisfies the property $\varphi$. The model generation framework is further configured for outputting the generated abstract model.

In a further aspect, the invention relates to a computer-implemented method for automated hardware-software co-verification. The method comprises providing a model generation framework. The model generation framework is configured for learning an unknown regular language representing the behavior of the hardware or of the software of the hardware-software co-design which does not violate a property $\varphi$ that a software-hardware co-design is required to satisfy. The language is represented by strings. The model generation framework receives input data comprising: (i) the property $\varphi$ that the software-hardware co-design is required to satisfy; (ii) an interface alphabet $\Sigma$, the interface alphabet being the set of all symbols that are allowed to occur in any string that can be defined in the unknown regular language, each symbol representing an event occurring in the software-hardware co-design, each string describing a sequence of events representing a behavior of the hardware or software logic; (iii) a concrete model of the behavior of the hardware of the hardware-software co-design; and (iv) a concrete model of the behavior of the software of the hardware-software co-design.

According to one possible implementation variant "a", the framework receives an abstract model of the software of the hardware-software co-design. The model generation framework generates an abstract interface model. The generation comprises checking whether a string of symbols representing a sequence of events specified in the language of the abstract interface model satisfies the property $\varphi$ in the concrete software model $M_{SW}$; if this is not the case, the framework checks if a restricted form of the sequence of events which does not satisfy the property in the concrete software model satisfies the property $\varphi$ in the concrete hardware model $M_{HW}$.

According to another possible implementation variant "b", the framework receives an abstract model of the hardware of the hardware-software co-design. The model generation framework generates an abstract interface model. The generation comprises checking whether a string of symbols representing a sequence of events specified in the language of the abstract interface model satisfies the property $\varphi$ in the concrete hardware model $M_{HW}$; if this is not the case, the framework checks if a restricted form of the string which does not satisfy the property in the concrete hardware model satisfies the property $\varphi$ in the concrete software model $M_{SW}$.

Then, irrespective of whether the abstract model of the interface of the hardware-software co-design was created according to "a" or "b," the model generation framework outputs the generated abstract model. The language of the generated abstract model solely comprises strings representing sequences of events which all satisfy the property $\varphi$ in the concrete hardware model $M_{HW_B}$ and in the concrete software model $M_{SW}$. This is because during the generation of the model, any string that results in the generation of an event that conflicts with the property is removed from the language of the model, thereby refining the abstract model to be generated.

In a further aspect, the invention relates to a computer program product comprising computer-readable instructions which, when executed by a processor, cause the processor to perform one of the above specified methods for automated hardware-software co-verification.

In a further aspect, the invention relates to a computer system comprising the learning framework and the software checker and/or the hardware checker, the computer system being configured for performing one of the above specified methods for automated hardware-software co-verification.

According to an aspect of the present invention, there is a method, computer program product and/or system that performs the following steps (not necessarily in the following order): (i) receiving input data including: a required occurrence that the abstract model is required to produce, a concrete software model representing a software behavior, the software behavior corresponding to execution of software logic, and a set of all symbols allowed to occur in any string that can be defined in a specified regular language, each symbol representing an individual event occurring in the software logic, each string describing a sequence of events representing a behavior of the software logic; (ii) checking whether a first event in a first sequence of events produced by the concrete software model satisfies the required occurrence; (iii) learning the specified regular language representing behavior of the software logic according to the concrete software model that produces the first event, the learned regular language being represented by strings; (iv) generating an abstract software model of the behavior of the software, the generated abstract software model satisfying the required occurrence; and (v) outputting the generated abstract software model.

According to an additional aspect of the present invention, there is a method, computer program product and/or system that performs the following steps (not necessarily in the following order): (i) co-verifying a software-hardware co-design group by checking whether a second event in a second sequence of events produced by a concrete hardware model of a hardware behavior, the hardware behavior corresponding to execution of hardware logic, satisfying the required occurrence; (ii) generating an abstract hardware model of the behavior of the hardware, the generated abstract hardware model satisfying the required occurrence; and (iii) outputting a set of co-verified abstract models including the generated abstract software model and the generated abstract hardware model. The required occurrence is a plurality of events including the first event and the second event. The software logic is associated with the hardware logic as a member of the software-hardware co-design group. The input data further includes the concrete hardware model of the behavior of the hardware logic. The set of all symbols further includes symbols representing individual events occurring in the hardware logic. The learned regular language further represents behavior of the hardware logic.

BRIEF DESCRIPTION OF THE SEVERAL VIEWS OF THE DRAWINGS

FIG. 5 depicts a concrete hardware model and a property $\varphi$ that the abstract model that is to be generated is required to satisfy according to embodiments of the invention.

FIG. 7 depicts a concrete hardware model and a concrete software model of a software-hardware co-design and a property $\varphi$ that the abstract hardware or software model is required to satisfy according to embodiments of the invention.

DETAILED DESCRIPTION

Figure 1A:
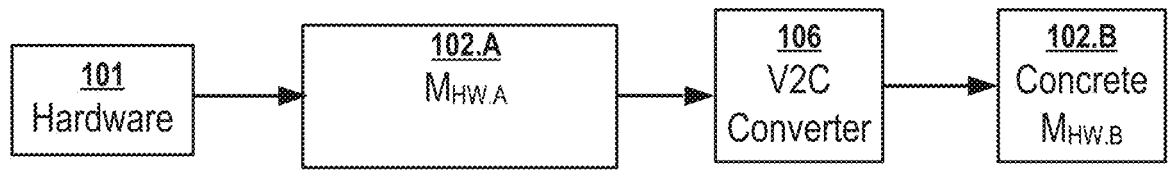
FIG. 1a depicts a block diagram illustrating the generation of a concrete hardware model in C programming code according to embodiments of the invention.

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure.

Abstract models of software and/or hardware logic are created e.g., for easing the verification and testing of the respective hardware and/or software logic. However, the generation of abstract models is typically performed manually or semi-manually and is a highly error prone and time consuming task. Moreover, the testing environment is often designed specifically for the particular software or hardware under test and is not able to flexibly test and verify a broad variety of software and/or hardware modules.

Some embodiments of the present invention are directed to co-verification of software and hardware logic and abstraction of hardware/software co-designs. The resulting flexible testing environment based on the abstraction is not designed specifically for a set of software and hardware, but flexibly applies to a broad variety of software and/or hardware modules. In this way, the abstract modules created with the computerized approach disclosed herein have a much broader application than conventional abstract models that are specifically designed for a particular hardware and/or software system.

In the following description, embodiments of the present invention are explained in greater detail, by way of example only, making reference to the drawings.

Embodiments of the invention may have the beneficial effect that the process of generating abstract models of software and/or hardware logic may greatly be facilitated and accelerated: the concrete model of a piece of software or hardware logic is typically already available. The input alphabet and its symbols representing "events" in the hardware or software logic may be specified, reviewed and modified easily. The provided input alphabet may be used to determine the granularity of the generated abstract model: the finer the granularity of the input alphabet, i.e., the larger the number of symbols contained in the alphabet, the larger the number of possible events evaluated and modeled and the less abstract the generated abstract model is. Model generation is automated and is thus much more error robust and efficient than prior art approaches which are based on manually specifying abstract models. Moreover, the generation of the abstract model is highly generic and can flexibly be used for all kinds of software or hardware or software-hardware-co-designs (SW-HW-co-designs).

Embodiments of the invention may allow to automatically create an abstract model of any hardware or software logic or of hardware or software in a SW-HW-co-design. Thus, an automated learning of the control path, data path, module hierarchy and/or an interface behavior of a SW-HW-co-design may be provided. Moreover, embodiments of the invention may allow checking if an abstract model of the hardware of a SW-HW-co-design satisfies a defined property. In addition, or alternatively, the framework may allow checking if an abstract model of the software of a SW-HW-co-design satisfies the defined property.

The term property as used herein refers to a particular operational requirement, such as a particular event or events, whether occurring as an intermediate event or an outcome event. A required property may also be considered to be a characteristic event or outcome associated with operation of a concrete model or abstract model. More precisely, and as discussed in more detail below, a required property should be found in operation of both the concrete model and abstract model, whether a model of the hardware or software or a combination of hardware and software models. Further, a property may be the occurrence of an observable event in the hardware model when some events in the software model occur. A property may include a set of operational requirements, outcomes, or intermediate results. For example, a property representing a requirement of a hardware component may require acknowledgement, with a "controller.ack" signal, of the receipt of each data submission to the hardware component. For another example, the hardware events required as a set of properties, or property, can be output signal "observable events" or internal signal "hidden events." In that way, a property may be defined such that if the software event, ESW, is set to transmission mode, then the ready signal of the hardware module DECODER must be HIGH in the next clock.

As discussed in more detail below, a property may be an interface requirement. For example, an interface requirement may include "submit," a software variable, and "con-troller:ack," a hardware signal. A property may be a sequence of events that occurs in a hardware model checker or a software model checker. Further, the property may be a sequence of events that occurs in the concrete model.

Embodiments of the invention may allow programmers to write device-independent, high performance applications that control a piece of hardware by automatically generating an abstract model of the hardware that uses standard operating system (OS) calls to hardware as input. The input alphabet used for generating this abstract model may basically consist of symbols representing events that correspond to standard OS calls to the hardware. For example, the process of abstracting pieces of hardware can be done from the perspective of a central processing unit (CPU). Each type of CPU has a specific instruction set architecture (ISA). The ISA represents the primitive operations of the machine that are available for use by assembly programmers and compiler writers. One of the main functions of a compiler is to allow a programmer to write an algorithm in a high-level language without having to care about CPU-specific instructions. Then it is the job of the compiler to generate a CPU-specific executable. The same type of abstraction is made in operating systems, but OS APIs now represent the primitive operations of the machine, rather than an ISA. This allows a programmer to use OS-level operations (e.g., task creation/deletion) in their programs while retaining portability over a variety of different platforms. For each of these levels of abstractions, a respective abstract model of the hardware can be generated by using a respective input alphabet as input of the learning framework. For example, the input alphabet used for generating a first abstract model of a piece of hardware may represent names of CPU-specific operations and the input alphabet used for generating a second abstract model of the piece of hardware may represent names of OS-level operations.

FIG. 1a depicts a block diagram illustrating the generation of concrete hardware models as C programs for use by embodiments of the present invention. For example, if concrete hardware model 102.A is specified in synthesizable Verilog or in VHDL (Verilog hardware description language), it is converted by a Verilog-to-C converter 106 to a C-program hardware model, which serves as program hardware model 102.B input for model generation framework 302, also referred herein as "learning framework." (Note: the term "Verilog" and/or "VHDL" may be subject to trademark rights in various jurisdictions throughout the world and are used here only in reference to the products or services properly denominated by the marks to the extent that such trademark rights may exist.) Verilog is used only an example of a hardware description language. In other embodiments, other languages may be used. The Verilog-to-C converter may perform the conversion automatically when the hardware description language of concrete hardware model 102.A is input to the converter.

Figure 1B:
FIG. 1b depicts a block diagram illustrating the generation of concrete software model according to embodiments of the invention.

FIG. 1b depicts a block diagram illustrating the creation of an abstract model for software 103 logic. In this case, the C code of the software logic can be used directly as input for learning framework 302. Thus, the generation of a concrete model for hardware logic as depicted in FIG. 1a may comprise an additional conversion step in comparison to the use of a concrete software logic as depicted in FIG. 1b. However, once program hardware model 102.B and concrete software model 102.C have been provided, the rest of the flow for abstraction and synthesis is the same for software and hardware.

Figure 2:
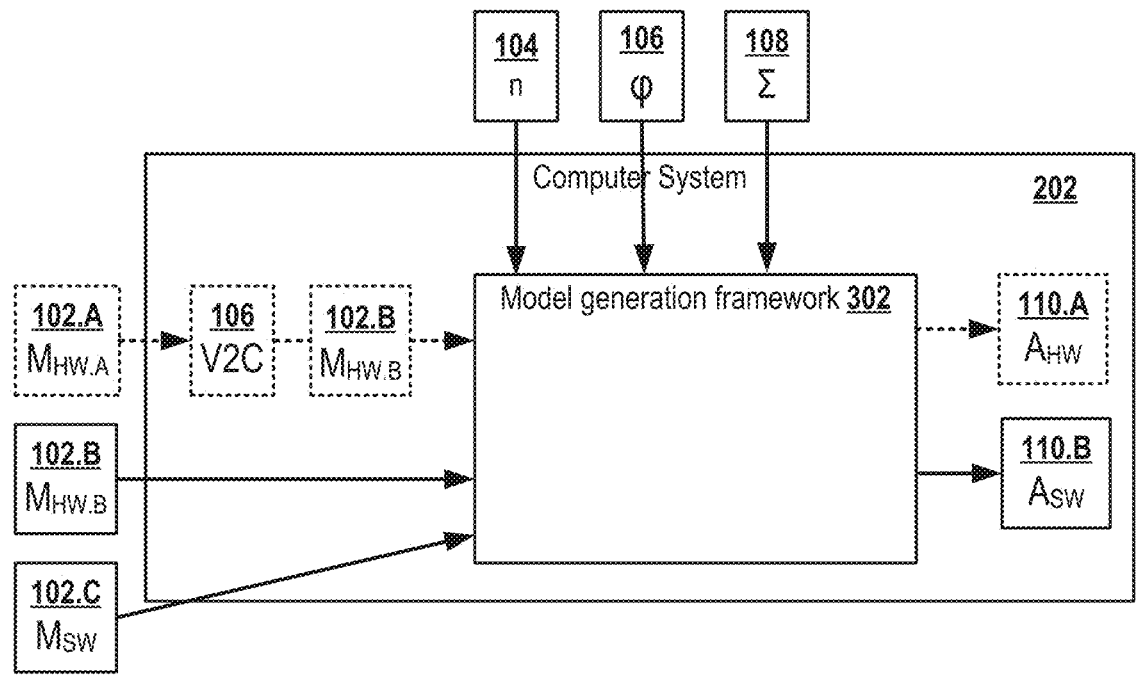
FIG. 2 depicts a computer system comprising a model generation framework according to embodiments of the invention.

FIG. 2 depicts a computer system comprising a model generation framework for generating an abstract model from a concrete model according to embodiments of the invention.

For example, the model generation framework can be instantiated on a server computer system, e.g., computer system 202; a cloud computer system; or a standard computer system. The computer system can comprise one or more processors, a main memory and a non-volatile storage medium for storing the executables of framework 302, for storing concrete models of software or hardware and for storing the abstract models of the software or hardware which were generated by framework 302.

The model generation framework is configured for learning an unknown regular language representing the behavior of hardware 101 or software 103 logic depicted in FIGS. 1a and 1b, whereby the behavior does not violate a property φ that abstract model 110.A or 110.B (collectively referred to as 110) is required to satisfy. The language being represented by strings "t".

The model generation framework is configured to receive input data. The input data comprise: (i) the property φ that abstract model A is required to satisfy; (ii) a concrete model M, e.g., program hardware model 102.B or concrete software model 102.C, of the behavior of some hardware or software logic, e.g., the logic of hardware 101 or of software 103 depicted in FIGS. 1a, 1b; and (iii) an alphabet Σ, the alphabet being the set of all symbols that are allowed to occur in any string that can be defined in the unknown regular language; each symbol represents an event occurring in hardware 101 or software 103 logic; each string describes a sequence of events representing a behavior of hardware 101 or software 103 logic.

The model generation framework is configured to generate abstract model 110 of the behavior of the hardware or software. The generated abstract model satisfies the property φ. The generation comprises checking whether a sequence of events in the concrete model M, e.g., concrete models 102.B or 102.C, satisfies the property φ. If this is not the case, the respective string that encodes the sequence of the events is not used as an element of the language of the abstract model to be generated.

The model generation framework is configured to output the generated abstract model A. For example, the first generated abstract model that consists of one or more strings that all satisfy the property φ may be output by the framework as the result.

Thus, a fully automated abstraction of a software or a hardware using learning is enabled by transferring concepts of the regular languages to the field of SW-HW modeling and testing. By using an alphabet of a desired granularity level as input, the granularity and abstraction level of the generated abstract model may easily be controlled, and the same abstraction approach may be used for generating models of many different abstraction levels.

The generated abstract model A, e.g., $A_{HW}$ or $A_{SW}$, is an abstraction of the input concrete model restricted only to the alphabet used as input. This may be useful in particular in the field of program analysis and verification. The learning framework allows to automatically generate abstract models of any piece of program logic that "abstracts away" details of behavior of the concrete design as specified e.g., in the software's program code or e.g., in the hardware Verilog design. Any other hardware description logic, e.g., VHDL, may be used as well. The level of abstraction is controlled by tuning the alphabet set for the learning framework. The learning algorithm can be presented a property so that the algorithm learns the abstract behavior that results in property satisfaction fully automatically. The abstraction is preferably based on an unsupervised learning algorithm.

Figure 3:
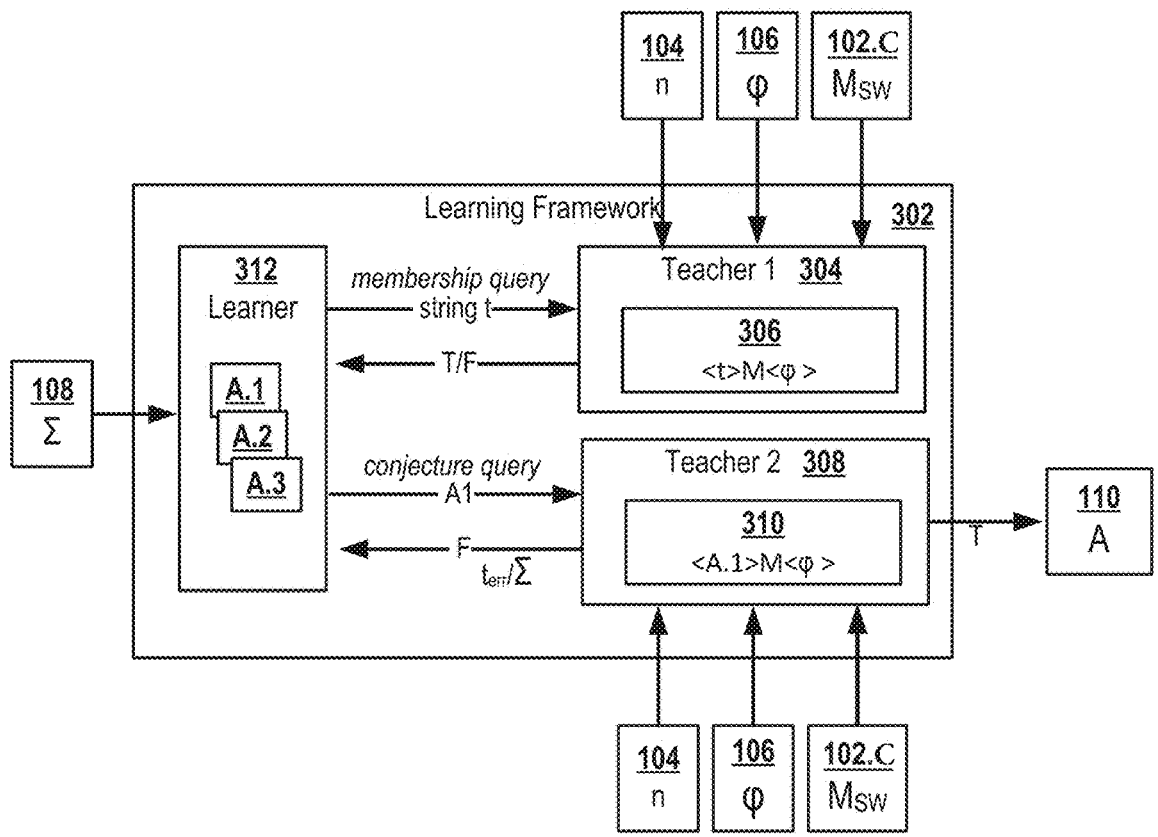
FIG. 3 depicts the model generation framework according to embodiments of the invention.

FIG. 3 is a block diagram showing learning framework 302 of FIG. 2 and its components. According to embodiments, the abstract model A.1 generated by the framework is a model that uses strings created from symbols of the input alphabet for describing the dynamic behavior of the hardware logic or the software logic. The complexity of the generated abstract model is limited by the size of alphabet 108. Thus, a straight forward, easy to use and error robust method is provided for automatically creating abstract models of an arbitrary piece of program logic that has a desired level of abstraction/granularity. For example, the learning framework may create abstract model A.1 for a particular piece of hardware, e.g., a graphics card or an Ethernet card, or a software logic like a driver. Then, the learning framework may check various strings belonging to the language of the abstract model for generating abstract model A.2 as a refined version of abstract model A.1. The checking of strings continues and further refined versions A.3 of the model are generated until a final abstract model is generated and output whose language solely comprises strings which satisfy the property 106.

According to embodiments, a concrete model is configured such that at least one hidden (i.e., unobservable) event is generated when one or more conditions are met. The method further comprises modifying code of a concrete model by adding at least one additional variable which generates an observable event in response to the one or more conditions being met. A "hidden event" as used herein is an event in a concrete model (and the corresponding hardware or software logic represented by the concrete model) that is not observable by program routines outside of the concrete model (and the corresponding hardware or software logic). An "observable event" as used herein is an event observable by program routines outside of a concrete model.

For example, the call of a particular CPU instruction set is typically "hidden" from the perspective of an operating system, but is typically "visible" from the perspective of a compiler. In order to generate an abstract model of the CPU that allows the operating system to interact with the abstract model and to verify and test also "hidden" events, the source code of concrete model of the CPU is modified such that additional variables are introduced which generate additional, observable events which are "visible" e.g., to the operating system. The additional variables may be connected to hidden variables and conditions e.g., such that in case the one or more hidden variables get assigned particular parameter values, the conditions are considered as "met" and the observable variable is set to a predefined value. The value change in the additional variable corresponds to and triggers an observable event that allows the operating system to verify if a condition was met. The adding of additional variables to concrete models may allow creating abstract models which are guaranteed not to cause conflicts due to variables and states which correspond to hidden events that are usually not visible from outside a concrete model.

According to embodiments, abstract model 110 generated by learning framework 302 is implemented as a deterministic finite automaton (DFA) or as a collection of quantified Boolean formulas.

This may be advantageous as various tools and runtime environments for testing and refining deterministic finite automatons (referred to herein as, simply, automatons) already exist. By automatically generating abstract models in the form of automata, their handling and use for SW-HW testing may greatly be facilitated.

According to embodiments, the checking whether a sequence of events in a concrete model satisfies the property φ comprises executing, by learning framework 302, a software model checker or a hardware model checker such that the sequence of events occurs in the hardware model checker or the software model checker. The sequence of events is reported to the learning framework.

A "software model checker" as used herein is an existing program logic implementing an algorithmic analysis of programs to prove properties of their executions. This automates the reasoning about the program behavior with respect to the given correct specifications. Model checking and symbolic execution are used to verify the safety-critical properties of various kinds of software, in particular device drivers. The input to the software model checker is a program (here: a generated abstract model) and the one or more properties that have to be met by the software represented by the abstract software model. The output is the proof that the program is correct or a demonstration that there exists a violation of the specification by means of a counterexample in the form of a specific execution path.

For example, EBMC can be used as a hardware model checker. It includes both bounded and unbounded analysis, i.e., it can both discover bugs and is also able to prove the absence of bugs. It can read Netlists (ISCAS89 format), Verilog, System Verilog and SMV files. Properties can be given in linear temporal logic (LTL) or a fragment of System Verilog Assertions. (Note: the terms "EBMC", "Netlists", "ISCAS89", "System Verilog", "System Verilog Assertions", and/or "SMV" may be subject to trademark rights in various jurisdictions throughout the world and are sued her only in reference to the products or services properly denominated by the marks to the extent that such trademark rights may exist.)

According to further examples, rbsxs (RuleBase Sixth Sense, a hardware model checker from IBM), ExpliSAT (a software model checker for C programs from IBM), SPIN, BLAST, CBMC, cadence SMX or DBRover can be used as model checkers. (Note: the terms "rbsxs", "RuleBase Sixth Sense", "IBM", "ExpliSAT", "SPIN", "BLAST", "CBMC", "cadence SMX", and/or "DBRover" may be subject to trademark rights in various jurisdictions throughout the world and are sued her only in reference to the products or services properly denominated by the marks to the extent that such trademark rights may exist.)

According to further examples, the tool SDV (Static Driver Verifier) from Microsoft uses static analysis for windows device drivers. The back end analysis engine SLAM used model checking and symbolic execution for compile time static verification. The rules that are to be observed by the drivers for each API are specified in a C like language SLIC (Specification Language for Interface Checking). The analysis engine finds all paths which can lead to violations of the API usage rules and are presented as source level error paths through the driver source code. Internally, it abstracts the C code into a boolean program and a set of predicates which are rules that are to be observed on this program. Then it uses the symbolic model checking to validate the predicates on the boolean program. Another existing software model checker is the model checker BLAST (Berkeley Lazy Abstraction Software verification Tool). It is used to find memory safety and incorrect locking errors in Linux kernel code. (Note: the terms "SDV", "Static Driver Verifier", "Microsoft", "SLAM", and/or "Berkeley Lazy Abstraction Software verification Tool" may be subject to trademark rights in various jurisdictions throughout the world and are sued her only in reference to the products or services properly denominated by the marks to the extent that such trademark rights may exist.)

A "hardware model checker" as used herein is an existing program logic implementing an algorithmic analysis of a hardware logic to prove properties of its execution. This automates the reasoning about the hardware behavior with respect to the given correct specifications. As for the software model checker, the input to the hardware model checker is a program (here: a generated abstract model of the hardware under test) and the one or more properties that have to be met by the hardware represented by the abstract hardware model. The output is the proof that the hardware is correct or a demonstration that there exists a violation of the specification by means of a counterexample in the form of a specific execution path.

Preferentially, the hardware model checkers and/or the software model checkers that are used according to embodiments of the invention are off-the-shelf checkers. This allows automatically evaluating generated abstract models for any kind of hardware or software logic. For example, existing software or hardware model checkers can be used as plug-ins of the model generation framework and can be used as teachers as described in greater detail for other embodiments of the invention. This may further reduce time and effort for generating and testing abstract models.

According to alternative embodiments, the checking whether a sequence of events in a concrete model satisfies the property φ comprises executing, by learning framework 302, the sequence of events in concrete software model 102.C, such that the sequence of events (represented as string "t") occurs in the concrete software model. The sequence of events is reported to the learning framework.

For example, a string that encodes a trace to be performed in a hardware can look as follows: t={{ }, {ack}, {valid}, {ack, valid}, {valid, ack}, . . . }.

According to embodiments, the method further comprises automatically translating abstract model 110 into an executable software program or into a specification of a hardware module, the specification being coded in a hardware description language. This may be advantageous, because an executable software model in the form of a C program or an abstract model of a hardware logic specified in hardware description language (HDL) is automatically synthesized.

According to embodiments, concrete software model 102.C input in framework 302 is executable program code specified in a software program language. For example, C, SystemC, or C++ can be used for specifying the concrete software model. In many cases, the software logic, e.g., a driver software, is already available in the form of a suitable programming language, e.g., C and can directly be used "as its own model."

According to other embodiments, the software or hardware logic that is represented by program hardware model 102.B and that is provided as input to learning framework 302 is a hardware logic. The method further comprises receiving concrete hardware model 102.A of the hardware logic. The concrete hardware model is specified in a hardware description language. The method comprises transforming concrete hardware model 102.A into program hardware model 102.B. The program hardware model is executable program code specified in C programming language. For example, C, System C, or C++ can be used for specifying program hardware model 102.B. The transformation can be performed, for example, by program module 106 that is an integral part of framework 302. Alternatively, program module 106 can be a standalone application program that is instantiated on computer system 202 such as model generation framework or on any other computer system.

Embodiments of the invention utilize learning algorithms such as Angluin's learning algorithm (L*), candidate disjunctive normal form (CDNF), or similar algorithms for automatically generating conflict-free abstract models of existing hardware or software logic at an arbitrary level of abstraction.

According to embodiments, learning framework 302 comprises learner module 312 and two teacher modules, 304 and 308, in accordance with the learner and teacher elements of the L* Angluin learning algorithm or in accordance with a formula in CDNF. The learning framework automatically combines the symbols of the input alphabet for generating strings, whereby multiple strings represent the language of an abstract model to be generated and refined. For example, the learning framework can be configured for concatenating all symbols of the input alphabet in a way that the generated strings (which may have a predefined maximum length) cover all possible combinations and sequential orders of symbols of the input alphabet.

According to embodiments, many different kinds of input alphabets can be provided to learning framework 302 as input, e.g., alphabets whose symbols represent events related to modules, functions, control commands, data, or interface functionalities of the software, hardware or software-hardware co-design that is analyzed. By defining and/or selecting alphabet 108 that is provided to the learning framework as input, the granularity and also the aspects of the hardware or software that are considered as relevant in the analysis can flexibly be chosen and can be used for automatically generating abstract models whose granularity and semantic focus is determined by the input alphabet.

According to embodiments, alphabet 108 is a module alphabet. The module alphabet consists of symbols respectively representing a module of software 103 or hardware 101 logic for which an abstract model is to be created. The activation or instantiation of the modules are the events represented by the symbols of the alphabet. Each string of the module alphabet describes a sequence of steps that activate or instantiate modules and that correspond to the respectively activated or instantiated modules.

According to other embodiments, alphabet 108 is a function alphabet. The function alphabet consists of symbols respectively representing a function of software 103 or hardware 101 logic for which an abstract model is to be created. The calling of the functions are the events represented by the symbols. Each string of the function alphabet describes a sequence of functions calling each other.

According to another embodiments, alphabet 108 is a control alphabet. The control alphabet consists of symbols respectively representing a control statement. The control statements are implemented by software 103 or hardware 101 logic for which an abstract model is to be created. The execution of a control statement corresponds to the event represented by a respective one of the symbols. Each string of the control alphabet describes a sequence of control statements sequentially executed in a series of causally-connected events, e.g., a series of control commands triggering the execution of further control commands. For example, function alphabets can be used to learn the function call hierarchy of a program. For example, the function call hierarchy observed in a program may be f1.f2.f3.f1 meaning that function f1 is followed by f2 which is further followed by call to f3 and so on. Control alphabets can be used to learn branching in a program.

According to yet another embodiments, alphabet 108 is a data alphabet. The data alphabet consists of symbols respectively representing an event. The events are thrown by software 103 or hardware 101 logic upon assigning a particular value to a particular parameter that is monitored and/or controlled by software logic 103 or hardware logic 101.

According to still yet another embodiment, alphabet 108 is a user-defined alphabet. The user-defined alphabet comprises symbols of one or more of the module alphabet, the function alphabet, the control alphabet and the data alphabet.

According to some embodiments of the present invention, learning framework 302 comprises a graphical user interface (GUI) (not shown) that enables a user to select, define, and/or modify one or more of the above mentioned alphabets. Thus, a user is enabled to flexibly define alphabet 108, thereby not only defining the semantic coverage and the abstraction level of the alphabet, but also the semantic content and the level of abstraction of an automatically generated abstract model.

Thus, input alphabet 108 may contain names of modules, functions, if-then-else branches, and internal variables. Optionally, the source code of the concrete module is modified by adding variables that turn "hidden" events into events that are observable by learning framework 302 to ensure that the learning framework can efficiently simulate and examine all kinds of strings and the corresponding sequence of (observable) events for the given input alphabet. The events in the concrete model of the hardware or software for which an abstract model shall be generated that are observable by learning framework 302 are basic atoms for describing the behavior of the concrete hardware model and the concrete software model that are used as input.

In one example, the source code of program hardware model 102.B is modified to make hidden events "observable" by adding a special function "learn_event(id)" at desired locations in the source code of the program hardware model. The desired location can be, for example, an entry point of functions or branches of the program hardware model examined. The desired location depends on input alphabet 108 provided. Each location in the source code where this function was inserted gets assigned its own, unique id, where id is an identifier that uniquely identifies an event that is thrown when the corresponding code location is executed. The set of event IDs (i.e., location-IDs) constitute alphabet 108 that is input into learning framework 302. The learning framework automatically generates strings t by executing the program hardware model with many different input parameters to ensure that every possible path of executing the source code of the program hardware model is executed. Each path of events is transformed by learning framework 302 into a respective string, i.e., a sequence of symbols of the input alphabet representing the events along possible execution paths of the program hardware model. The language of the abstract model to be generated is denoted by L(A), where L(A) may contain some or all of the valid strings.

According to some embodiments of the present invention, learning framework 302 automatically learns an unknown language representing the behavior of software 103 or hardware 101 logic over input alphabet 108.

According to embodiments, learning framework 302 comprises first teacher module 304, second teacher module 308, and learner module 312. The first teacher module is capable of obtaining knowledge of the regular language of abstract model 110 to be generated by simulating one or more events in the input model, whether program hardware model 102.B or concrete software model 102.C. The second teacher module is capable of obtaining knowledge of the regular language by simulating abstract model 110 in the form of an automaton. The simulation comprises analyzing one or more strings representing sequences of events in the input model. The learner module is configured for learning the regular language by sending membership queries to the first teacher module and by sending conjecture queries to the second teacher module.

According to embodiments, model generation framework 302 uses Assume-Guarantee Reasoning for generating the abstract models. Learning framework 302 can be configured to learn abstract models, also referred to as "assumptions" or "candidate abstract models". The learning framework creates the weakest assumption that can be used to prove or disprove that the assumption satisfies the property φ. The learning algorithm implemented by the learning framework terminates with and returns an abstract model that describes exactly those strings over the input alphabet which, when executed in the input model, satisfy the property φ. First teacher 304 checks, via software model checking, if the input model satisfies φ in the context of a particular string t. This is indicated by the following expression:

<t>M<φ>   306 where M is the input model, t is the string, and φ is a selected property. If the first teacher returns "true," it means that t is an element of the language of abstract model 110. Otherwise, the answer to the membership query is false. Informally, the first teacher checks if the concrete software model satisfies the property when a particular control path, data path, interface behavior, or a module hierarchy represented by the symbols of the string provided by the membership query is present or active. Input alphabet 108 determines which one of the above is present or activated. If the input alphabet contains interface signals, learning framework 302 learns the abstraction of the environment.

Learner 312 evaluates the responses of first teacher 304 to a plurality of membership queries respectively comprising different strings which represent sequences of events to be tested. Based on the received responses of the first teacher to the membership query, the learner generates (or learns) "candidate" or "intermediate" abstract models A.1, A.2, A.3 which represent a conjecture. The learner has an objective to learn and identify a conjecture that meets a predefined criteria and that correctly describes some aspects of the behavior of the software or hardware represented in the input model. To achieve this, learner 312 sends the candidate abstract model A.1 in a conjecture query to second teacher 308. The second teacher checks, via software or hardware model checking, if the input model satisfies φ in the context of candidate abstract model A.1. This is indicated by the following expression:

<A.1>M<φ>   310 where M is the input model, A.1 is the candidate abstract model, and φ is a selected property. If the second teacher returns "true," the candidate abstract model is output by learning framework 302 as a correct abstraction of the input model. If the second teacher returns "false," for the conjecture query and candidate abstract model A.1, the second teacher returns, in addition to the resulting "false" finding, an error string $t_{err}$. The error string, also referred to as a "counter example," allows learner 312 to learn the sequence of events that resulted in the context of candidate abstract model A.1 being in a violation of property φ. Informally, at a certain point in learning, learner 312 makes a guess about the language (the behavior) of the hardware or software logic it is learning. It makes this guess based on Yes/No responses of the first teacher. This guess is an automaton or a deterministic finite state machine that is called a "conjecture," "abstract model candidate," "abstract model," or, simply, "abstraction." The second teacher checks if the abstract model candidate is such that expression 310 is met. If the expression is true for the candidate, the candidate model is output as final abstract model 110. If it is not true, the second teacher returns a counterexample t, to the learner that removes the counterexample trace from the abstraction. This information is used for generating a refined version of the next abstract model candidate such as A.2.

According to embodiments, learning framework 302 makes membership queries to a teacher. That is, it asks the teacher if some particular string(s) belong to the language of the input model. Depending on the answer received from the teacher, the framework makes a conjecture about the abstraction and asks another teacher if the conjecture is right. If the conjecture is right, the conjecture is returned as the abstract model for a specific piece of hardware or software logic for which the input model represents. Otherwise, the conjecture needs to be strengthened and a further abstract model candidate is generated. Preferably, existing software and hardware model checkers, in particular bounded model checkers, are used by the first teacher for analyzing individual strings and for answering membership queries. The second teacher preferably uses existing model checkers, in particular bounded model checkers or complete model checkers, for testing the abstract model candidates received via conjecture queries.

A "membership query" as used herein is a query that comprises a string t and that causes the receiving entity (e.g. the first teacher) to check whether the string belongs to a given regular language whose symbols are provided in the form of input alphabet 108. The membership query triggers the receiving entity to check if the input model satisfies a property φ in the context of the particular string t that was provided by the membership query. For example, in a membership query, the learner gives a word to a teacher and the teacher says whether or not a regular language that is known to the teacher contains that word.

A "conjecture query" as used herein is a query that comprises an abstract model candidate and that causes a receiving entity (e.g. a second teacher) to check if the input model satisfies a property φ in the context of the abstract model candidate that was provided by the conjecture query. For example, in a conjecture query, also known as "equivalence query", learner 312 gives regular language, represented by an automaton, to second teacher 308 for evaluation. The second teacher responds with whether or not the languages of the learner and input model are equal. If yes, the protocol is finished. If no, the second teacher gives a counterexample, i.e. a word where the languages of the learner and the input model disagree.

Using conjecture queries and membership queries may have the advantage that existing tools and algorithm may be readily applied in a new technical field, i.e., the field of software design and analysis, for automatically creating abstract models of a software or hardware logic that has an arbitrary level of abstraction.

According to embodiments, the generation of the abstract model that satisfies the property φ comprises generating, by learner module 312, a plurality of strings t. The strings are generated by concatenating symbols of alphabet 108. For example, the learning framework generates a set of strings by combining all symbols of the input alphabet in any possible logical combination and sequential order. Thus, a fully automated generation of candidate languages and corresponding candidate models are generated and are refined automatically by checking if any of the automatically generated strings and respectively encoded events and behaviors results in a conflict in an input model with the desired property φ. Then, learner module 312 sends a membership query for each of the strings to first teacher module 304. Each membership query comprises one of the strings. First teacher module 304 checks, for each of the sent strings, if the string belongs to the regular language. The checking comprises executing the input model such that the sequence of events represented by the string is simulated as occurring in the input model of the hardware or software logic. The executed input model generates signals. The first teacher checks if the signals satisfy the property φ. Then, the first teacher module returns a result of the checking for each of the strings to learner module 312. The result is that the checked string t belongs to the regular language in case the signals satisfy the property φ. The result is that the string does not belong to the regular language in case the signals do not satisfy the property φ.

According to embodiments, the generation of an abstract model satisfying the property φ further comprises that learner module 312 receives the results of the checking of strings provided by the first teacher module. The learner module uses the received results as input for generating first abstract model A.1. The first abstract model represents behaviors of software 103 or hardware 101 logic for transitioning from one state to another when processing events. Learner module 312 sends the first abstract model in a conjecture query to second teacher module 308. Then, second teacher module 308 determines whether a formal language represented by the first abstract model is equal to the regular language of the input model. The determination comprises executing, by the second teacher module, the input model such that the behavior of the software or hardware module represented by the first abstract model is simulated, and determining if signals generated during this simulation satisfy the property φ. The second teacher module returns a result of the checking to the learner module. Where the result returned by the second teacher module indicates that the first abstract model does not fulfill the property φ, the learner module generates a second abstract model A.2, which is actually a refined version of first abstract model A.1. The second abstract model represents behaviors of software 103 or hardware 101 logic for transitioning from one state to the next when processing events that are different than the first abstract model. The previous steps of sending conjecture queries, checking the second abstract model, which is actually a refined version of the first abstract model, and returning results of the checking of each of the abstract models is repeated until a final abstract model is identified by the second teacher that satisfies the property φ. This process may be implemented as an abstract model refinement process. Where the result returned by the second teacher module indicates that first abstract model A.1 does fulfill the property φ, the first abstract model is returned and output by the learning framework as abstract model 110 that correctly describes the behavior of the hardware or software logic based on given input alphabet 108.

The above specified architecture of learning framework 302 has been observed to yield particularly reliable results in a reproducible, fast and fully automated manner.

According to embodiments, the input data further comprising number 104. This number is an optional input parameter and may not be required, e.g., for embodiments which do not use bound model checkers. The number is indicative of the maximum number of symbols that are concatenated by learner module 312 for generating strings t representing the sequence of events simulated in input models. Thus, number 104 restricts the exploration of behavior only to a depth corresponding to the number. This may have the advantage that the evaluation of strings and the simulation of respective behavior in the input model is accelerated and the response times to the membership queries is reduced.

A "bounded model checker" as used herein is a model checker that checks and explores the behavior of a particular software or hardware logic only to given depth corresponding to number 104. This may impose a limit to the length of the behavior path (provided e.g., as a string of concatenated symbols) that is accepted as input by the bounded model checker.

A "complete model checker" as used herein is a model checker that checks and explores the behavior of a particular software or hardware logic to a "completeness threshold." For example, binary-decision-diagram-based algorithms can be used for complete model checking.

According to some embodiments, the software or hardware logic for which an abstract model is to be created is hardware 101 logic comprising a clock. The number n is the number of clock cycles of the clock that are to be considered and analyzed when performing the checking whether a simulation of a sequence of events (and corresponding symbols and clock cycles) in the program hardware model satisfies the property φ.

According to other embodiments, the software or hardware logic for which an abstract model is to be created is software 103 logic comprising a loop. The number n is the number of times the loop must be executed when performing the checking whether a simulation of a sequence of events in the concrete software model satisfies the property φ.

Thus, number 104 may allow a user to determine the depth of analysis and the time required until a valid abstract model for the software or hardware logic can be identified and returned.

Figure 6:
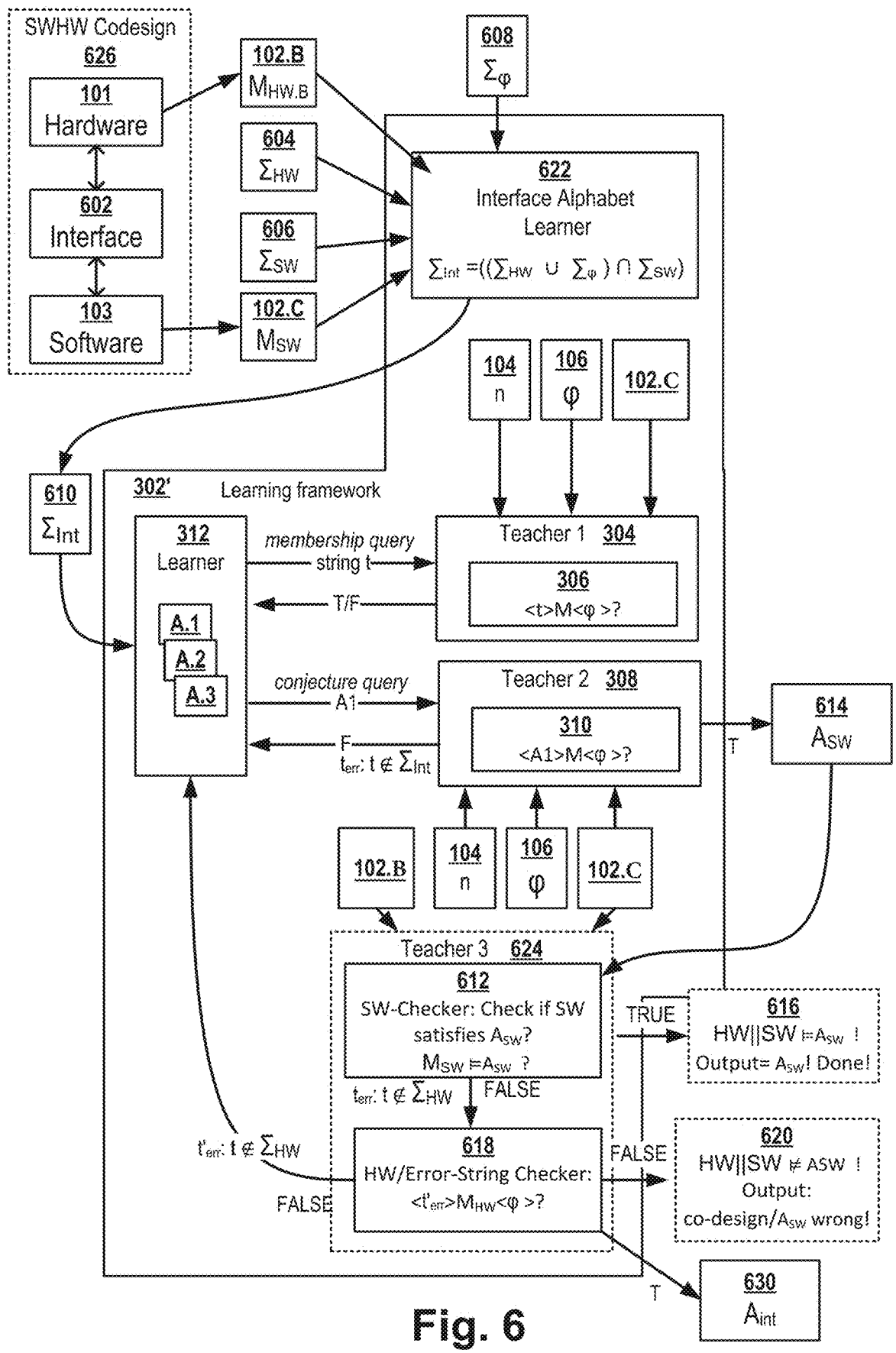
FIG. 6 depicts a block diagram of a learning framework used for software-hardware co-verification according to embodiments of the invention.
Figure 8:
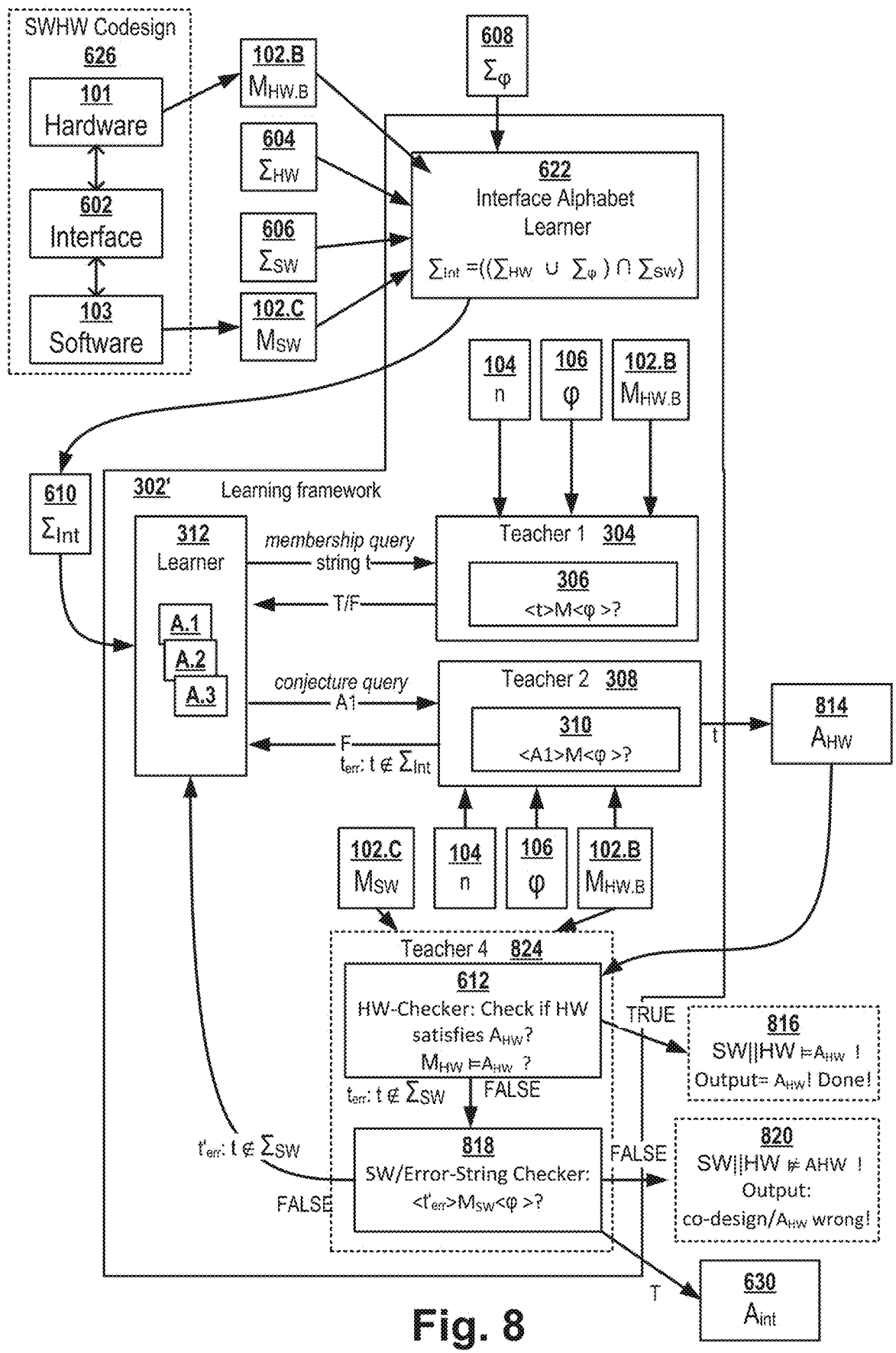
FIG. 8 depicts a block diagram of a learning framework used for software-hardware co-verification according to embodiments of the invention.

According to embodiments, first teacher 304, second teacher 308, and learner 312 can be used for automatically generating an abstract software model 110.B for software 103 logic from a software alphabet and from concrete software model 102.C. In addition, or alternatively, teachers 304 and 308 and learner 312 can be used for fully automatically generating an abstract hardware model 110.A for hardware 101 logic from a hardware alphabet and from program hardware model 102.B. Then, the abstract software model can be used to represent the environment of hardware 101 for automated HW-SW-co-verification by providing the software model as input to a third teacher. This approach is depicted in FIG. 6. Alternatively, the abstract hardware model can be used to represent the environment of software 103 for automated HW-SW-co-verification by providing the hardware model as input to the third teacher. This approach is depicted in FIG. 8. The third teacher may use the environmental model together with an interface alphabet for automatically learning and generating abstract interface model 630.

Figure 4:
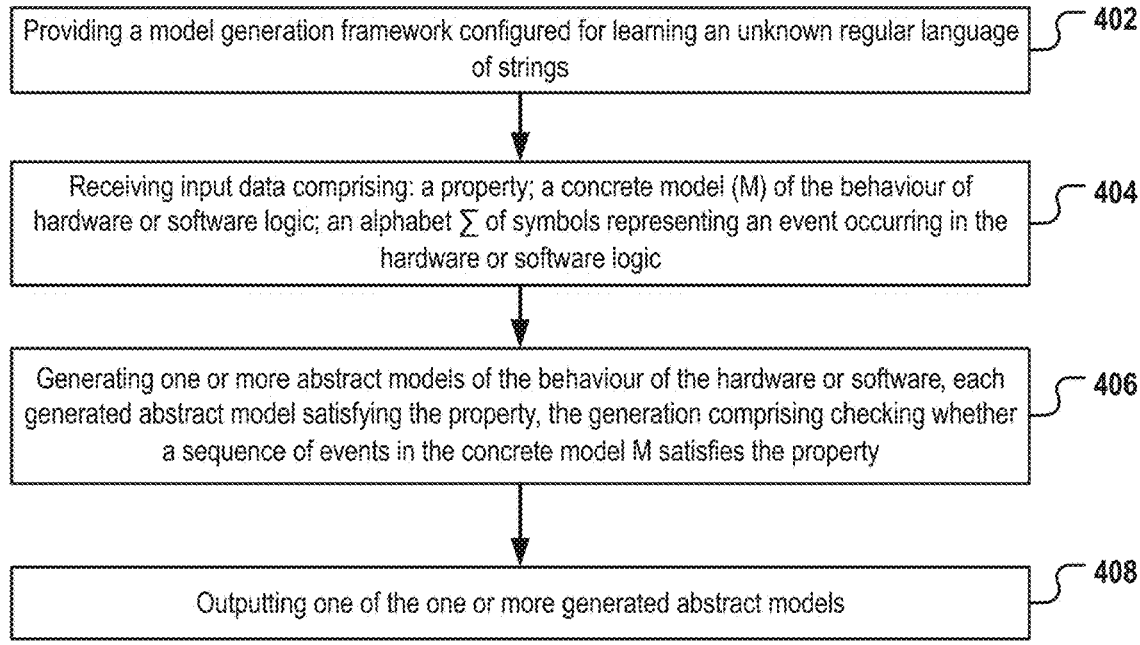
FIG. 4 depicts a flowchart of a method for generating an abstract model from a concrete model according to an embodiment of the invention.

FIG. 4 depicts a flowchart of a method for generating an abstract model of the behavior of hardware 101 or software 103 logic as depicted, for example, in FIGS. 1a and 1b. The method can be implemented and performed by learning framework 302 as depicted, for example, in FIGS. 2 and 3.

In step 402, model generation framework 302 is provided. The model generation framework can be, for example, a software application that is installed and instantiated on computer system 202 depicted in FIG. 2. The model generation framework is configured for learning an unknown regular language representing the behavior of the hardware or software logic which is represented by strings and which does not violate a property φ that the abstract model is required to satisfy.

In step 404, the model generation framework receives input data. The input data comprise the property 106 that the abstract model is required to satisfy, a concrete model of the behavior of the hardware or software logic (102.B and/or 102.C), and an alphabet 108 being the set of all symbols that are allowed to occur in any string that can be defined in the unknown regular language. Each symbol represents an event occurring in the hardware or software logic, each string describing a sequence of events representing a behavior of the hardware or software logic.

In step 406, the model generation framework generates abstract model candidate A.1 of the behavior of the hardware or software which satisfies the property 106. The generation comprises checking whether a sequence of events in the concrete model satisfies the property 106.

In step 408, the model generation framework outputs the final abstract model, which would be abstract model candidate A.1 if it checks out during processing.

FIG. 5 depicts an example of a concrete hardware model (in Verilog) and a property φ that the abstract model that is to be generated is required to satisfy. The hardware model is derived from the RegEx matching accelerator design in the Raphael Javascript library. (Note: the term(s) "Raphael" and/or "Javascript" may be subject to trademark rights in various jurisdictions throughout the world and are used here only in reference to the products or services properly denominated by the marks to the extent that such trademark rights may exist.) The property φ represents the requirement that the hardware—and thus also its abstract model—must acknowledge (with a "controller.ack" signal) the receipt of each data submission to the hardware. If an entity submitting data to the hardware or hardware model does not receive the controller.ack signal within a predefined time limit, the property φ is violated and the abstract model of the hardware is assumed to comprise an error. Abstract model 110 generated by the model generation framework for the hardware logic in respect to this property is as follows:

$$A=\text{submit}==>\text{valid},$$

where A is the final abstract model.

According to FIG. 6, HW-SW co-verification involves use of abstract software model 614 to represent the environment of the hardware. As shown, FIG. 6 depicts a block diagram of learning framework 302' used for SW-HW co-verification according to a further embodiment of the invention. According to some embodiments, learning framework 302' may basically comprise all modules like framework 302 depicted in FIG. 4, supplemented by some additional modules, e.g., further teacher module 624. According to other embodiments, learning framework 302' may basically comprise learner 312 and teacher module 624. For example, the SW-HW co-design may relate to particular hardware 101, e.g., a graphic card, and particular software 103, e.g., a driver for the graphic card. The totality of defined commands and messages that can be exchanged between the hardware and the software are referred herein as "interface" 602 of the software and hardware logic. HW/SW interface 602 specifies the HW interface signals that can be accessed by software 103 to drive the hardware inputs or to receive an acknowledgement from hardware 101.

Learning framework 302' implements a computer-implemented method for automated hardware-software co-verification according to embodiments of the invention. The learning framework is configured for learning an unknown regular language representing the behavior of the hardware or of the software of the hardware-software co-design which does not violate a property 106 that the software-hardware co-design is required to satisfy. The language is represented by strings. The learning framework receives input data. The input data comprises at least the property that the software-hardware co-design is required to satisfy; typically, more than one property is received by the framework. The input data further comprises interface alphabet 610. The interface alphabet is the set of all symbols that are allowed to occur in any string that can be defined in the unknown regular language, each symbol representing an event occurring in software-hardware co-design 626. Each string "t" describes a sequence of events representing a behavior of the hardware or software logic. In addition, the input data comprises program hardware model 102.B and concrete software model 102.C.

According to a first implementation variant A, depicted in FIG. 6, learning framework 302' receives abstract model 614 and generates abstract interface model 630. The generation comprises checking whether a string of symbols t representing a sequence of events specified in the language of the abstract interface model satisfies the property 106 in concrete software model 102.C; and if not, checking if a restricted form of the sequence of events which does not satisfy the property in the concrete software model satisfies the property 106 in program hardware model 102.B.

According to an alternative implementation variant B, depicted in FIG. 8, learning framework 302' receives abstract hardware model 814 and generates abstract interface model 630. The generation comprises checking whether a string of symbols representing a sequence of events specified in the language of the abstract interface model satisfies the property 106 in program hardware model 102.B. If this is not the case, the learning framework checks if a restricted form of the string satisfies the property in the concrete software model.

Finally, the model generation framework, according to both implementation variants, outputs an abstract model whose language solely comprises strings representing sequences of events that all satisfy the property 106 in both the program hardware model and the concrete software model.

Some embodiments of the present invention may have the advantage that a fully automated, formal co-verification of hardware-software (HW-SW) co-designs is provided as abstract model 814 may be evaluated both against a concrete software model as well as against a concrete hardware model. Several tools exist for verifying either hardware or software alone. Formal hardware verification as well as formal software verification has received enormous success in recent years. Both fields are active areas of research. However, formally verifying HW-SW co-designs, though desirable, remains a less explored domain. There are very few industrial, research and/or academic tools available to perform either hardware verification or software verification. However, due to the ever increasing size of hardware and software systems which need to be formally verified, and due to the complexity of possible interactions between both systems, co-verification of both hardware and software is often not possible. Often, only components of the software and the hardware are examined. This involves the risk that incompatibilities and conflicts may not be detected and an erroneous SW-HW co-design is produced. To the contrary, embodiments of the invention which use compositional verification via learning for verification of HW/SW co-designs allows to fully automatically verify also complex software or hardware components and respective abstract models in highly complex and large SW-HW co-designs by using methods and models derived from the field of regular languages, e.g., some alphabets.

For example, the SW-HW co-verification according to embodiments of the invention can be used for performing pre-RTL and/or post-RTL co-verification (RTL is an acronym for register transfer level). At pre-RT level, the hardware is represented as an untimed concrete model specified in System C, C, or C++, and the software or firmware is usually specified as a concrete software model in C/C++. At the post-RT level, the hardware is represented as a concrete hardware model in the form of an RTL description containing low-level details about area, timing and power. Software or device-driver firmware is represented as a concrete software model in the form of an RTL description in C/C++.

According to embodiments, the concrete software model is descriptive of behaviors of the software, each software behavior being represented as a string of symbols of a software alphabet 606. The software alphabet is the set of all symbols that are allowed to occur in any string that can be defined in a regular language and that represent an event in the software.

Program hardware model 102.B is descriptive of behaviors of the hardware. Each hardware behavior is represented as a string of symbols of a hardware alphabet 604. The hardware alphabet is the set of all symbols that are allowed to occur in any string that can be defined in a regular language and that represent an event in the hardware.

According to embodiments, the hardware alphabet is one of: a module alphabet, a function alphabet, a control alphabet, a data alphabet, a user-defined alphabet.

According to embodiments, the software alphabet is one of: a module alphabet, a function alphabet, a control alphabet, a data alphabet, a user-defined alphabet.

This may be advantageous, because a plurality of different software and/or hardware alphabets may be used for modeling many different types of aspect of the software and/or the hardware of the hardware-software co-design on many different levels of abstraction. Thus, a great flexibility of testing a hardware-software co-design and of generating a respective abstract interface model may be provided.

According to embodiments of the implementation variant C, the checking whether a sequence of events specified in the language of an abstract interface model satisfies the property 106 in the concrete software model comprises: in case software checker 612 having performed the checking determines that abstract software model 614 does not comply with concrete software model 102.C, the learning framework restricts the error string (i.e., the string representing the sequence of events that caused the conflict detected by software checker 612) to a restricted error string by removing all symbols from the error string that are only contained in software alphabet of the software, not in the interface alphabet 610.

The restricted error string is provided to the hardware checker 618. The hardware checker simulates the events represented by the restricted error string in the program hardware model. Selectively, in case the simulation by the hardware checker returns that the events represented by the restricted string violates the property 106, the hardware checker outputs a message that the software-hardware co-design comprises errors and provides the restricted string to learning module 312 of learning framework 302 or 302,' which is configured for performing a method as described herein for embodiments of the invention for generating the abstract interface model.

To be more particular, the method of co-verifying SW-HW co-design 626 can comprise a step of receiving, by learning framework 302' used for SW-HW co-verification, abstract software model 614. The abstract software model is a model of behaviors of software 103 of hardware-software co-design 626. Each behavior is a sequence of events. Each sequence of events is represented as a string "t" of symbols of interface alphabet 610. The interface alphabet is the set of all symbols that are allowed to occur in any string that can be defined in a regular language and that respectively represent an interaction between hardware 101 and software 103 of hardware-software co-design 626 that is supported by a respective interface protocol. Then, software checker 612 checks, if concrete software-model 102.C of software 103 complies with abstract software model 614 when the abstract software model is simulated in concrete software model 102.C. The concrete software model describes behaviors of software 103. Each software behavior is represented as a string "t" of symbols of software alphabet 606. The software alphabet is the set of all symbols that are allowed to occur in any string that can be defined in a regular language and that represent an event in the software. If the simulation by software checker 612 returns that the software complies with the abstract software model, returning that the software-hardware-co-design is error-free. A corresponding output of learning framework 302' is represented as output 616.

In the following, co-design 626 verification on the post-RTL level will be described by making reference to multiple embodiments and examples, some of which being depicted in FIGS. 6-8. Learner 312 of learning framework 302' uses, according to embodiments of the present invention, assume-guarantee reasoning for hardware/software co-verification that comprises a first step of automatically learning an abstract model that describes the behavior of the software in the form of automaton 614. Then, learned abstract software model 614 is simulated by software checker 612 in a concrete software model of the software to check whether interacting software 103 conforms to the hardware behavior of the program hardware model. The abstract software model can be read from a data storage medium or received via a network from another computer system. Alternatively, the abstract software model can be automatically created by a method described herein for embodiments of the present invention, the method being illustrated in FIGS. 1-5. Any obtained error string may then evaluated in the context of a concrete software model by software checker 818.

The features of some embodiments of the present invention may be advantageous as a fully automated SW-HW co-verification using compositional verification via learning is provided that does not require the manual construction of a common representation for co-design 626. Moreover, embodiments of the invention may be highly scalable due to learning interface automaton for compositional verification that can deal also with highly complex concrete models. In a further beneficial aspect, the granularity of the interface alphabets may be used for defining the abstraction level of the abstract model of co-design 626 to be created, thereby preventing size explosion of the model for the co-design. In a further beneficial aspect, embodiments of the invention may be applicable to both pre-RTL and post-RTL co-verification and may allow the use of existing, off-the-shelf hardware and software model checkers by learning framework 302'.

According to embodiments, the software-hardware co-design is configured such that the software and the hardware are exchanging data via the coherent accelerator-processor interface (CAPI).

For example, the text analytics field-programmable gate array (FPGA) accelerator of IBM describe a highly complex HW/SW co-design has been successfully verified by embodiments of this invention. The application consists of a software runtime that executes a super-graph. This super-graph is responsible for fetching the documents to be analyzed, running query operations on the data and storing the results. One or more query operations may be sub-graphs that are executed by the FPGA hardware. For these type of operations, the software and the hardware are exchanging data via the CAPI. The communication is non-trivial as the result-size of the operations carried out on the FPGA cannot be determined ahead of time. Thus, the FPGA might request additional memory from the software (similar to a malloc) before continuing its operation. These mechanisms need to be verified to ensure proper communication between multiple software threads and several hardware threads. Incorrect behavior might result in data-loss or corruption among the operating threads. With CAPI, the number of such tight HW/SW co-designs will increase as the driver abstraction level software is completely removed by this technology. Thus, embodiments of the invention may allow efficient, fully automated and accurate evaluation and co-verification of emerging, highly complex applications and accelerators.

Co-design 626 can comprise, for example, hardware 101 being described by program hardware model 102.B and software in the form of the hardware's interacting device driver software 103, which is described by concrete software model 102.C. There may exist an interface property 106 that captures the interactions between the hardware and the software and that specifies the occurrence of some observable event in the hardware when some events in software occur.

According to embodiments of the present invention, software checker 612 may have determined that software 103 (according to the concrete software model) does not comply with the generated abstract software model. In this case, the one of the strings $t_{err}$ of the abstract software model representing a sequence of events that violates the software is sent from software checker 612 to hardware checker 618. The learning framework restricts the error string $t_{err}$ to a restricted error string $t'_{err}$ by removing all symbols from the error string $t_{err}$ that are only contained in software alphabet 606, not in interface alphabet 610 and provides the restricted string to hardware checker 618. This step may ensure that violations of the property that are not caused by the actual environment of the hardware, i.e., by those parts of the software that interact with the hardware (the interface), are ignored. This may ease and accelerate the HW-SW co-verification. Then, the hardware checker simulates the events represented by the restricted error string $t'_{err}$ in a program hardware model of hardware 101. The program hardware model is descriptive of behaviors of hardware 101. Each hardware behavior is represented as a string of symbols of hardware alphabet 604. The hardware alphabet is the set of all symbols that are allowed to occur in any string that can be defined in a regular language and that represent an event in the hardware. Selectively in case the simulation by the hardware checker returns that the events represented by the restricted string violates the property 106 the hardware checker outputs message 620 that the software-hardware-co-design comprises errors.

Selectively in case the simulation by the hardware checker returns that the events represented by the restricted string do not violate the property 106, the hardware checker provides the restricted string $t'_{err}$ to learner module 312 of learning framework 302' (also referred to as model generation framework). The learning framework is configured for generating abstract models from concrete models, such as program hardware model 102.B and concrete software model 102.C, alphabet 604 or 606, a property 106 that must be fulfilled, and optional number 104. The property 106 can be a set of properties 608 that must be fulfilled. The learning framework uses the error string for learning abstract interface model 630 of interface 602.

According to embodiments, the method for automated verification of HW-SW co-design 626 comprises automatically generating abstract software model 614 and using the abstract software model as input to third teacher 624 for learning an abstract interface model. Thereby, the learning framework uses interface alphabet 610 as the input alphabet.

According to embodiments, the method for automatically performing a HW-SW co-verification further comprises automatically computing interface alphabet 610 (from a plurality of existing alphabets). The computation comprises receiving, by learning framework 302', a hardware alphabet, such as hardware alphabet 604. The hardware alphabet consists of symbols respectively representing an event that can occur in hardware 101. Learning framework 302' further receives a software alphabet, such as software alphabet 606. The software alphabet consists of symbols respectively representing an event that can occur in software 103. Furthermore, learning framework 302' receives a requirement alphabet, such as set of properties 608, the requirement alphabet consisting of symbols respectively representing a property 106 that needs to be fulfilled by software-hardware-co-design 626. Then, the learning framework computes the interface alphabet according to the following formula:

$$\Sigma_{Int}=((\Sigma_{HW}\cup\Sigma_{\varphi})\cap\Sigma_{SW}),$$

where $\Sigma_{Int}$ is the interface alphabet; $\Sigma_{HW}$ is the hardware alphabet; $\Sigma_{\varphi}$ is the requirements alphabet; and $\Sigma_{SW}$ is the software alphabet.

For example, the computation of an interface alphabet can be performed as follows:

$$\Sigma_{Int}=((\{HW.valid,HW.ack\}\cup\{SW.subunit,SW.ack\})\cap\{SW.subunit,HW.ack\})=\{SW.subunit, HW.ack\}.$$

Learning framework 302' applies an assume-guarantee logic, e.g., for checking the property 106 on a co-design system. The simplest assume-guarantee rule for checking the interface property on a system with a program hardware model and a concrete software model is given as follows:

$$<A_{Int}>M_{HW}<\varphi>; \text{ and} \qquad \text{Rule1:}$$

$$<true>M_{SW}<A_{Int}>, \qquad \text{Rule2:}$$

where $A_{Int}$ is the abstract interface model; $M_{HW}$ is the program hardware model; $\varphi$ is the property; and $M_{SW}$ is the concrete software model.

As shown above, $A_{Int}$ denotes assumptions about the environment of the hardware. The environment of the hardware is in fact those routines of the software which interact with the hardware, i.e., "interface routines." In addition, abstract software model 614 of software 103 describes aspects of the "environment" of hardware 101 and is input to framework 302.' The abstract software model must be specific ("strong") enough for allowing checking whether hardware 101 satisfies the property. At the same time, the abstract software model must be abstract ("weak") enough to capture and permit the behavior of software 103 (and the respective concrete software model).

According to some embodiments of the present invention, a fully automated learning framework 302, 302' is configured to automatically learn abstract interface model 630 that selectively describes the interaction of software and hardware over interface alphabet 610 provided as input to a learning framework 302'. The same framework, e.g., learning framework 302 or learning framework 302', may be used to automatically generate an abstract hardware model, such as abstract hardware model 814 (FIG. 8) from a concrete hardware model and/or to generate an abstract software model, such as abstract software mode 614 (FIG. 6) from a concrete software model.

According to some embodiments of the present invention, the learning of abstract interface model 630 can be described as follows: since the interface alphabet selectively contains the set of interface signals between hardware 101 and software 103, learning framework 302' learns and abstracts the environment of the hardware provided in the form of abstract software model 614 such that in the context of program hardware model 102.B, all properties 106 are met as follows:

$$M_{HW} \| A_{SW} \models \varphi,$$

where $M_{HW}$ is the program hardware model; $A_{SW}$ is the abstract software model; and $\varphi$ is the property.

Then, the following steps are performed by learning framework 302': (i) checking, by software checker 612, whether the abstract software model is valid in the concrete software model:

$$M_{SW} \| \models A_{SW},$$

where $M_{SW}$ is the concrete software model and $A_{SW}$ is the abstract software model; (ii) if yes, it is known that the abstract software model in the context of the program hardware module fulfills the property 106 for the hardware as follows:

$$M_{HW} \| A_{SW} \models \varphi,$$

where $M_{HW}$ is the program hardware model and $A_{SW}$ is the abstract software model; (iii) if not, software checker 624 sends the string $t_{err}$ acting as counterexample to hardware checker 618; (iv) hardware checker 618 restricts the string to $t'_{err}$ by removing all symbols which are not element in interface alphabet 610; and (v) the hardware checker checks whether the abstract hardware model, $A_{HW}$, meets the property in the context of the restricted string, $t'_{err}$:

$$t'_{err} | A_{HW} \models \varphi.$$

If this is not the case, the corresponding abstract software model, such as abstract software model 614, violates 106 and is considered not to be a valid/conflict free co-design model. If this is the case, further strings t of abstract software model 614 are examined as described above. If none of the strings of the abstract software model violates property 106, the learner module learns and returns a valid abstract interface model, e.g., abstract interface model 630. The abstract interface model is an abstraction of the abstract software model generated based on interface alphabet 610 in accordance with the method for automatically generating an abstract model as described herein for embodiments of the invention.

According to embodiments, the learning framework 302' is generated by supplementing framework 302 (FIG. 4) with an additional teacher 624. The learning framework 302' can be implemented as a hierarchy of teachers resorting to another teacher in case it is not able to compute the verification result. The counterexample, $t_{err}$, from the second teacher is a real trace in software that violates abstract software model 614. However, it may or may not violate property 106 in the abstract hardware model in the context of the abstract software model. This check is done with the help of model checker 618 to check if $t'_{err}$ restricted to the interface alphabets when simulated on hardware satisfies the property. If it does not, then $t'_{err}$ is a real counterexample. If it does, the third teacher returns the error string $t'_{err}$ restricted to the interface alphabet to learner module 312.

According to some embodiments, learner module 312 of learning framework 302' uses the L* Angluin learning algorithm or any other learning algorithm, e.g., CDNF. According to some embodiments, the hardware alphabet is one of the following: a module alphabet, a function alphabet, a control alphabet, a data alphabet, and a user-defined alphabet. According to some embodiments, the software alphabet is one of the following: a module alphabet, a function alphabet, a control alphabet, a data alphabet, and a user-defined alphabet.

The HW/SW interface property specification must capture all HW/SW interaction behaviors described by the interface protocol. A semantic model, which captures relative atomicity and concurrency model in HW/SW interfaces, is used according to embodiments of the invention as test harnesses for co-verification to uncover HW/SW design bugs. HW/SW interaction is represented as a set of events in a software (e.g., an application software or device driver) that triggers some finite length events in the hardware. The software events can be triggered by external environment or may be triggered by hardware interrupts (for example acknowledgement or exceptions). The hardware events are usually triggered by software or other entities interacting with the hardware. It is assumed that the hardware events complete within finite time. Based on this view, interface properties that follows implication structure the antecedent (ant) of the implication is a software event and the consequent (cons) is a hardware event. A software event can be a function call or some branch condition or checking status of a particular variable. A software event can be denoted as $E_{sw}$ and a hardware event as $E_{Hw}$.

Co-verification framework 302' of embodiments of the invention depicted in FIG. 6 receives input alphabet 610; one or more properties 106, which need to be met by the interface of the co-design; concrete software model 102.C; program hardware model 102.B; and abstract software model 614 as input. If multiple requirement properties 106 are provided, the properties can also be referred to as "requirements alphabet." The level of abstraction of the abstract interface model 630 to be generated depends on the granularity of interface alphabet 610.

The software can only access the interface signals (input or output) of the interacting hardware and does not have access to the internal signals of the hardware. Thus, from the software perspective, it is not necessary to know the program hardware model states (or traces) that lead to the state where the hardware event holds. This notion of execution allows learning framework 302 to learn an abstract representation of the hardware traces and generate a minimal automaton that is abstract model 630 of the HW-SW interface and is suitable for scalable reasoning during co-verification. The abstraction level of learned abstract interface model 360 depends on the granularity of interface alphabet 610 as described below.

According to some embodiments of the present invention, the learning framework classifies two different types of HW/SW interface alphabet symbols, herein also referred to as "interface properties." Class 1 Property: the hardware event, $E_{HW}$, specifies properties on hardware modules only. For example, when the software variable "jobReady" is high, then the hardware module CORE must be turned on first which is followed by TRANSMITTER. Class 2 Property: the hardware event, $E_{HW}$, specifies properties on hardware modules as well as hardware signals. The hardware events can be output signal "observable events" or some internal signal "hidden events." For example, if the software event, $E_{SW}$, is set to transmission mode, then the ready signal of the hardware module DECODER must be HIGH in the next clock.

Properties of Class 1 are more abstract since they only capture hardware module hierarchy. Hence, it is sufficient to learn the hardware behavior in terms of the module invocation sequence. Thus, the interface alphabet provided for learning abstract interface model 630 only involves module names to check property of Class 1. Due to the coarse nature of $E_{HW}$, learning framework 302' learns the module hierarchy of the entire hardware design by specifying an assert(0) at the end of the main module. This guarantees that even for extremely large hardware designs, the size of learned abstract interface model is still manageable. However, properties of Class 2 are more detailed and involve HW interface signals. Hence, the learning framework is preferably configured to learn the minimal DFA representation of the HW behavior that keeps track of the signals involved in $E_{HW}$.

FIG. 7 depicts an example of a concrete hardware model and a concrete software model of a SW-HW co-design and a property φ that the abstract model that is to be generated is required to satisfy. The co-design whose respective concrete model codes are partially depicted in FIG. 7 are derived from Raphael's RegEx matching accelerator design. The HW/SW co-design system comprises a concrete hardware model, M1, a concrete software model, M2, and a user-defined property φ that represents an interface requirement. The interface requirement contains "submit," a software variable, and "controller:ack," a hardware signal. It is easy to see that the requirement property holds in the co-design.

A compositional rule is applied by a first teacher to learn an abstract software model, $A_{SW}$, that is the environment of the concrete hardware model, M1, such that the following triples hold true:

$<A_{SW}>M1<φ>$.

Teacher 2 is then invoked to check rule 2, which checks the following triples by discharging the assumptions of the abstract software model, $A_{SW}$, on the concrete models:

$<true>M1\|M2<φ>$.

If Teacher 2 returns true, then the assume-guarantee rule guarantees that the following triples are true:

$<true>M1\mu M2<φ>$.

For the illustrated example, the triples can be summarized as follows:

$<A_{SW}>$valid➜ ack$<$submit➜ controller.ack$>$  Teacher 1:

$<$true$>$submit➜ valid$<A_{SW}>$.  Teacher 2:

The alphabet of the interface is computed as follows:

$\Sigma_{Int}=((\Sigma_{M1}\cup\Sigma_{φ})\cap\Sigma_{M2})=\{\text{subunit,valid}\}$, where $\Sigma_{Int}$ is the interface alphabet; $\Sigma_{M1}$ is the concrete hardware model alphabet; $\Sigma_{φ}$ is the set of properties; and $\Sigma_{M2}$ is the concrete software model alphabet.

The abstract software model conjectured by Teacher 1 over the interface alphabet is summarized as follows:

$A_{Int}$=subunit➜ valid.

Accordingly, the following triples are satisfied according to the illustration of FIG. 7:

$<$true$>$submit➜ valid$<$submit➜ valid$>$, so, Teacher 2 returns true. In that way, the following assume guarantee rule is true:

$<$true$>M1\|M2<φ>$.

FIG. 8 depicts a block diagram of a learning framework used for SW-HW co-verification according to a further embodiment. The embodiment depicted in FIG. 8 basically corresponds to the embodiment depicted in FIG. 6. However, FIG. 6 illustrates embodiments implemented according to a first implementation variant "A" while FIG. 8 illustrates embodiments implemented according to an alternative implementation variant "B". As already explained for FIG. 6, a model generation framework is provided that is configured for learning an unknown regular language representing the behavior of hardware-software co-design 626 which does not violate a property φ that a software-hardware co-design is required to satisfy. The language being represented by strings t. The model generation framework comprises an interface for receiving input data. The input data comprises one or more properties φ that the software-hardware co-design is required to satisfy. interface alphabet 610 is the set of all symbols that are allowed to occur in any string that can be defined in the unknown regular language. Each symbol represents an event occurring in the software-hardware co-design. Each string describes a sequence of events representing a behavior of the hardware or software logic. The input data further comprises program hardware model 102.B of the behavior of the hardware of the hardware-software co-design and concrete software model 102.C of the behavior of the software of the hardware-software co-design.

The framework is configured for receiving abstract model 814 of the hardware of the hardware-software co-design and for generating abstract interface model 630. The generation comprising checking whether a string of symbols representing a sequence of events specified in the language of the abstract interface model satisfies the property φ in the program hardware model. If this is not the case, the learning framework checks if a restricted form of the string which does not satisfy the property in the program hardware model satisfies the property φ in the concrete software model. The learning framework generates an abstract model whose language solely comprises strings representing sequences of events which all satisfy the property φ in the program hardware model and in the concrete software model and finally outputs the generated abstract model as a result.

According to embodiments, the checking whether a sequence of events specified in the language of the abstract interface model satisfies the property φ in the program hardware model comprises: in case abstract hardware model 814 does not comply with the program hardware model, the learning framework restricts the string representing the non-compliant sequence of events to a restricted error string by removing all symbols from the string which are only contained in hardware alphabet of the hardware, not in the interface alphabet. Then, the learning framework sends the restricted error string representing a sequence of events that violates the program hardware model to software checker 818. The checking if a restricted form of the sequence of events which does not satisfy the property in the program hardware model satisfies the property φ in the concrete software model in step b) comprises simulating, by the software checker, the events represented by the restricted error string in the concrete software model. Selectively in case the simulation by the software checker returns that the events represented by the restricted string violates the property φ, the software checker outputting a message that the software-hardware co-design comprises errors. The restricted error strings comprises information on the causative events which resulted in a violation of the property. This information is used by learner module 312 of learning framework 302' when generating new abstract model candidates, such as A.1, A.2, and A.3.

According to embodiments, selectively in case the simulation by the software checker returns that the events represented by the restricted string violate the property φ, the software checker provides the restricted string to learning module 312 as depicted, for example, in FIG. 3, 6, or 8. The learning framework is configured for performing a method for automatically generating an abstract model according to any one of the embodiments described herein for generating abstract interface model 830. The abstract interface model is an abstract, coarse-granular description of the behavior of interface 602 of hardware-software co-design 626.

A "string" as used herein is a string in the meaning of the formal language theory. A string is a finite sequence of members of an underlying base set; this set is called the alphabet. The members of the base set are called symbols, and are typically thought of as representing letters, characters, or digits. According to embodiments, the symbols represent events in the software or hardware.

A "regular language" (also called a "rational language") is a formal language that can be expressed using a regular expression, in the strict sense of the latter notion used in theoretical computer science (as opposed to many regular expressions engines provided by modern programming languages, which are augmented with features that allow recognition of languages that cannot be expressed by a classic regular expression). Alternatively, a regular language can be defined as a language recognized by a finite automaton.

An "automaton" as used herein is a program logic that models the behavior of an entity, e.g., a hardware or software logic, and that is supposed to run on some given sequence of inputs in discrete time steps. Automatons, as referred to herein, are deterministic finite automatons. An automaton gets one input every time step that is picked up from a set of symbols which is called an alphabet. At any time, the symbols so far fed to the automaton as input, form a finite sequence of symbols, which finite sequences are called strings. An automaton contains a finite set of states. At each instance in time of some run, the automaton is in one of its states. At each time step when the automaton reads a symbol, it jumps or transitions to another state that is decided by a function that takes the current state and symbol as parameters. This function is called the transition function. The automaton reads the symbols of the input word one after another and transitions from state to state according to the transition function, until the word is read completely. Once the input string has been read, the automaton is said to have stopped and the state at which automaton has stopped is called the final state. Depending on the final state, it's said that the automaton either accepts or rejects an input word. There is a subset of states of the automaton, which is defined as the set of accepting states. If the final state is an accepting state, then the automaton accepts the string. Otherwise, the string is rejected. The set of all the strings accepted by an automaton is called the "language of that automaton." Any subset of the language of an automaton is a language recognized by that automaton. In short, an automaton is a mathematical object that takes a string as input and decides either to accept it or reject it.

A "model" as used herein is a program logic, e.g., an executable C program or a piece of code in a hardware description language that emulates details of said software or hardware logic. For example, a "hardware model" can be implemented as a set of routines in software that emulate some platform-specific details of the hardware, giving programs direct access to the hardware logic.

An "abstract" model of a software or hardware logic is a model that comprises less details and allows the emulation of less routines of said software or hardware logic than a concrete model of said software or hardware logic. For example, according to embodiments of the invention, an abstract model can be created from a concrete model by inputting an alphabet into a module generation framework 302 that comprises only a sub-set of the symbols of the alphabet that is needed for defining words in the language of the complex model.

A "teacher" as used herein is a program logic that knows a regular language. A "learner" as used herein is a program logic that is interoperable with a teacher and that is configured to learn the regular language by sending two types of queries, membership queries and conjecture queries, to the teacher.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

"Present invention" as used herein should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

"Embodiment" as used herein see definition of "present invention" above—similar cautions apply to the term "embodiment."

"And/or" as used herein is inclusive or; for example, A, B "and/or" C means that at least one of A or B or C is true and applicable.

"User"/"subscriber" as used herein includes, but is not necessarily limited to, the following: (i) a single individual human; (ii) an artificial intelligence entity with sufficient intelligence to act as a user or subscriber; and/or (iii) a group of related users or subscribers.

"Module"/"Sub-Module" as used herein is any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

"Computer" as used herein is any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
receiving input data including: a required occurrence that an abstract model is required to produce, a concrete software model representing a software behavior, the software behavior corresponding to execution of software logic, and a set of all symbols allowed to occur in any string that can be defined in a specified regular language, each symbol representing an individual event occurring during execution of the software logic, each string describing a sequence of events representing the software behavior;
checking whether a first event in a first sequence of events produced by the concrete software model satisfies the required occurrence;
learning the specified regular language representing the software behavior according to the concrete software model that produces the first event, the learned regular language being represented by strings;
learning a function call hierarchy of the software behavior, wherein the function call hierarchy is the sequence of functions executed by the program;
modifying code of the concrete software model by adding at least one additional variable that generates an observable event in response to one or more conditions being met, and the function call hierarchy that generated the observable event, wherein the concrete software model is configured such that at least one hidden event is generated when one or more conditions are met, the hidden event not being observable by any program routine outside of the concrete software model, and further wherein the observable event being observable by a program routine outside of the concrete software model;
generating an abstract software model of the software behavior, the generated abstract software model satisfying the required occurrence, wherein the abstract software model is generated using assume-guarantee reasoning; and
outputting the generated abstract software model.

2. The computer-implemented method of claim 1, further comprising:
co-verifying a software-hardware co-design group by checking whether a second event in a second sequence of events produced by a concrete hardware model representing a hardware behavior, the hardware behavior corresponding to execution of hardware logic, satisfying the required occurrence;
generating an abstract hardware model of the hardware behavior, the generated abstract hardware model satisfying the required occurrence; and
outputting a set of co-verified abstract models including the generated abstract software model and the generated abstract hardware model;
wherein:
the required occurrence is a plurality of events including the first event and the second event;
the software logic is associated with the hardware logic as a member of the software-hardware co-design group;
the input data further includes the concrete hardware model of the hardware behavior;
the set of all symbols further includes symbols representing individual events occurring in the hardware logic; and
the learned regular language further represents the hardware behavior.

3. The computer-implemented method of claim 2, further comprising:
responsive to the outputting step, automatically translating the set of co-verified abstract models into an executable software program and a specification of a hardware module, the specification being coded in a hardware description language.

4. The computer-implemented method of claim 2, further comprising:
receiving an original concrete hardware model of the hardware logic specified in a hardware description language; and
transforming the original concrete hardware model into the concrete hardware model being executable program code specified in a software program language.

5. The computer-implemented method of claim 2, wherein the input data further includes a specified count indicating a maximum number of symbols that are concatenated for generating a string representing a sequence of events simulated in the concrete software model.

6. The computer-implemented method of claim 5, wherein:
the hardware logic is a clock; and
the specified count is the number of clock cycles of the clock to be considered when checking whether a simulation of the sequence of events in the concrete hardware model satisfies the required occurrence.

7. The computer-implemented method of claim 6, wherein checking whether a simulation of the sequence of events in the concrete hardware model satisfies the required occurrence includes:
executing a hardware model checker such that the sequence of events occurs in the hardware model checker, and
reporting the sequence of events for comparing to each string representing the hardware behavior.

8. The computer-implemented method of claim 1, where the abstract software model is generated as a deterministic finite automaton (DFA).

9. The computer-implemented method of claim 1, the abstract software model being generated as a collection of quantified Boolean formulas.

10. The computer-implemented method of claim 1, the set of all symbols being selected from the group consisting of:
a module alphabet consisting of symbols respectively representing a module of the software logic, the instantiation of the modules being the events represented by the symbols, each string of the module alphabet describing a sequence of instantiating modules;
a function alphabet consisting of symbols respectively representing a function of the software logic, the calling of the functions being the events represented by the symbols, each string of the function alphabet describing a sequence of functions calling each other;
a control alphabet consisting of symbols respectively representing a control statement being implemented by the software logic, the execution of the control statements being the events represented by the symbols, each string of the control alphabet describing a sequence of control statements sequentially executed in a series of causally-connected events;
a data alphabet consisting of symbols respectively representing an event being thrown by the software logic upon assigning a particular value to a particular parameter that is monitored and/or controlled by the software logic; and a user-defined alphabet comprising symbols of one or more of the module alphabet, the function alphabet, the control alphabet, and the data alphabet.

11. The computer-implemented method of claim 1, wherein the method is implemented in a model generation framework including:
- a first teacher module that obtains knowledge of the specified regular language by simulating one or more events in the concrete software model;
- a second teacher module that obtains knowledge of the learned regular language by simulating a candidate abstract model in the form of an automaton, the simulation comprising analyzing one or more strings representing sequences of events in the concrete software model; and
- a learner module that learns the specified regular language by sending membership queries to the first teacher module and by sending conjecture queries based on the learned regular language to the second teacher module.

12. The computer-implemented method of claim 11, wherein generating the abstract software model includes:
- generating, by the learner module, a plurality of strings by concatenating symbols of the set of all symbols;
- sending, by the learner module, a membership query for each string to the first teacher module;
- checking, by the first teacher module, whether each string belongs to the specified regular language including:
  - executing the concrete software model such that a corresponding sequence of events described by each string is simulated as occurring in the concrete software model, the concrete software model generating signals, and
  - checking whether the generated signals satisfy the required occurrence; and
- returning, by the first teacher module, a confirming result of the checking steps for each string to the learner module, the confirming result being: (i) that the string belongs to the specified regular language where the signals satisfy the required occurrence, or (ii) that the string does not belong to the specified regular language where the signals do not satisfy the required occurrence.

13. The computer-implemented method of claim 12, wherein generating the abstract software model further includes:
- receiving, by the learner module, the result of the checking steps for each string;
- responsive to the result, generating, by the learner module, a first abstract software model representing the software behavior for transitioning from one state to a next state when processing events;
- sending, by the learner module, the first abstract software model in the conjecture query based on the learned regular language to the second teacher module;
- determining, by the second teacher module, whether a formal language represented by the first abstract software model is equal to the learned regular language of the concrete software model, the determination including:
  - executing the first abstract software model to simulate the software behavior,
  - determining whether signals generated during this simulation satisfy the required occurrence; and
  - returning, by the second teacher module, a simulation result of the determining steps, the simulation result being: (i) that the first abstract software model does not satisfy the required occurrence, or (ii) that the first abstract software model does satisfy the required occurrence.

14. The computer-implemented method of claim 13, further comprising:
- responsive to receiving the simulation result that the first abstract software model does satisfy the required occurrence, outputting the first abstract software model as the generated abstract software model.

15. A computer program product comprising:
- one or more computer readable storage devices and program instructions stored on the one or more computer readable storage devices, the stored program instructions comprising:
- program instructions to receive input data including: a required occurrence that an abstract model is required to produce, a concrete software model representing a software behavior, the software behavior corresponding to execution of software logic, and a set of all symbols allowed to occur in any string that can be defined in a specified regular language, each symbol representing an individual event occurring in the software logic, each string describing a sequence of events representing the software behavior;
- program instructions to check whether a first event in a first sequence of events produced by the concrete software model satisfies the required occurrence;
- program instructions to learn the specified regular language representing the software behavior according to the concrete software model that produces the first event, the learned regular language being represented by strings;
- program instructions to learn a function call hierarchy of the software behavior, wherein the function call hierarchy is the sequence of functions executed by the program;
- program instructions to modify code of the concrete software model by adding at least one additional variable that generates an observable event in response to one or more conditions being met, and the function call hierarchy that generated the observable event, wherein the concrete software model is configured such that at least one hidden event is generated when one or more conditions are met, the hidden event not being observable by any program routine outside of the concrete software model, and further wherein the observable event being observable by a program routine outside of the concrete software model;
- program instructions to generate an abstract software model of the software behavior, the generated abstract software model satisfying the required occurrence, wherein the abstract software model is generated using assume-guarantee reasoning; and
- program instructions to output the generated abstract software model.

16. The computer program product of claim 15, wherein the computer readable storage media has further stored thereon:
- program instructions to co-verify a software-hardware co-design group by checking whether a second event in a second sequence of events produced by a concrete hardware model representing a hardware behavior, the hardware behavior corresponding to execution of hardware logic, satisfying the required occurrence;
- program instructions to generate an abstract hardware model of the hardware behavior, the generated abstract hardware model satisfying the required occurrence; and program instructions to output a set of co-verified abstract models including the generated abstract software model and the generated abstract hardware model;
wherein:
the required occurrence is a plurality of events including the first event and the second event;
the software logic is associated with the hardware logic as a member of the software-hardware co-design group;
the input data further includes the concrete hardware model of the hardware behavior;
the set of all symbols further includes symbols representing individual events occurring in the hardware logic; and
the learned regular language further represents the hardware behavior.

17. A computer system comprising:
one or more computer processors;
one or more computer readable storage media; and
program instructions stored on the one or more computer readable storage media for execution by at least one of the one or more computer processors, the stored program instructions comprising:
program instructions to receive input data including: a required occurrence that the abstract model is required to produce, a concrete software model representing a software behavior, the software behavior corresponding to execution of software logic, and a set of all symbols allowed to occur in any string that can be defined in a specified regular language, each symbol representing an individual event occurring in the software logic, each string describing a sequence of events representing the software behavior;
program instructions to check whether a first event in a first sequence of events produced by the concrete software model satisfies the required occurrence;
program instructions to learn the specified regular language representing the software behavior according to the concrete software model that produces the first event, the learned regular language being represented by strings;
program instructions to learn a function call hierarchy of the software behavior, wherein the function call hierarchy is the sequence of functions executed by the program;
program instructions to modify code of the concrete software model by adding at least one additional variable that generates an observable event in response to one or more conditions being met, and the function call hierarchy that generated the observable event, wherein the concrete software model is configured such that at least one hidden event is generated when one or more conditions are met, the hidden event not being observable by any program routine outside of the concrete software model, and further wherein the observable event being observable by a program routine outside of the concrete software model;
program instructions to generate an abstract software model of the software behavior, the generated abstract software model satisfying the required occurrence, wherein the abstract software model is generated using assume-guarantee reasoning; and
program instructions to output the generated abstract software model.

18. The computer system of claim 17, wherein the program instructions further include:
program instructions to co-verify a software-hardware co-design group by checking whether a second event in a second sequence of events produced by a concrete hardware model representing a hardware behavior, the hardware behavior corresponding to execution of hardware logic, satisfying the required occurrence;
program instructions to generate an abstract hardware model of the hardware behavior, the generated abstract hardware model satisfying the required occurrence; and
program instructions to output a set of co-verified abstract models including the generated abstract software model and the generated abstract hardware model;
wherein:
the required occurrence is a plurality of events including the first event and the second event;
the software logic is associated with the hardware logic as a member of the software-hardware co-design group;
the input data further includes the concrete hardware model of the hardware behavior;
the set of all symbols further includes symbols representing individual events occurring in the hardware logic; and
the learned regular language further represents the hardware behavior.

* * * * *